(12) United States Patent
Ishizuka et al.

(10) Patent No.: US 10,429,633 B2
(45) Date of Patent: Oct. 1, 2019

(54) IMAGING MODULE AND ENDOSCOPE

(71) Applicant: FUJIKURA LTD., Tokyo (JP)

(72) Inventors: Takeshi Ishizuka, Sakura (JP); Hideaki Usuda, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 330 days.

(21) Appl. No.: 15/286,690

(22) Filed: Oct. 6, 2016

(65) Prior Publication Data
US 2017/0153441 A1 Jun. 1, 2017

(30) Foreign Application Priority Data
Nov. 30, 2015 (JP) ................................. 2015-234029

(51) Int. Cl.
*G02B 23/24* (2006.01)
*H01R 13/405* (2006.01)
(Continued)

(52) U.S. Cl.
CPC ..... *G02B 23/2484* (2013.01); *G02B 23/2407* (2013.01); *H01R 13/405* (2013.01);
(Continued)

(58) Field of Classification Search
CPC ............ G02B 23/2484; G02B 23/2407; H04N 5/2254; H04N 5/2253; H04N 2005/2255;
(Continued)

(56) References Cited

U.S. PATENT DOCUMENTS 6,567,115 B1 5/2003 Miyashita et al.
2011/0249106 A1 10/2011 Makino et al.
(Continued)

FOREIGN PATENT DOCUMENTS

JP 2000-199863 A 7/2000
JP 2007-7429 A 1/2007
(Continued)

OTHER PUBLICATIONS

Communication dated Dec. 19, 2017 from the Japanese Patent Office in counterpart Application No. 2016-197509.
(Continued)

*Primary Examiner* — Alexandra L Newton
*Assistant Examiner* — Genja M Frankert
(74) *Attorney, Agent, or Firm* — Sughrue Mion, PLLC

(57) ABSTRACT

An imaging module of the invention includes: a connector including: a first implanted conductor; a second implanted conductor longer than the first implanted conductor; a first groove that includes a second mounting terminal constituting part of the first implanted conductor; a second groove that includes a third mounting terminal constituting part of the second implanted conductor; and a third groove that is located between the first groove and the second groove; and a coaxial cable including: an internal conductor that is provided in the first groove and is electrically connected to the second mounting terminal; a sheath conductor that is provided in the second groove and is electrically connected to the third mounting terminal; and a coated portion that is provided in the third groove.

18 Claims, 15 Drawing Sheets

(51) Int. Cl.
    *H01R 24/38*      (2011.01)
    *H04N 5/225*      (2006.01)

(52) U.S. Cl.
    CPC ........... *H01R 24/38* (2013.01); *H04N 5/2253* (2013.01); *H04N 5/2254* (2013.01); *H04N 2005/2255* (2013.01)

(58) Field of Classification Search
    CPC ... H01R 24/38; H01R 13/405; A61B 1/00114; A61B 1/00124; A61B 1/00126
    See application file for complete search history.

(56) References Cited

U.S. PATENT DOCUMENTS

2015/0365571 A1* 12/2015 Wada ................. G02B 23/26
                                                      348/374

2016/0029879 A1* 2/2016 Ishikawa ............ A61B 1/00114
                                                     600/110
2018/0132704 A1* 5/2018 Yamada .................. H04N 7/18

FOREIGN PATENT DOCUMENTS

| JP | 2011-217887 A | 11/2011 |
| JP | 2014-27431 A | 2/2014 |
| JP | 2014-42810 A | 3/2014 |
| WO | 2014/126144 A1 | 8/2014 |

OTHER PUBLICATIONS

Foreign Office Action for JP 2015-234029 dated Aug. 9, 2016.
Communication dated Sep. 26, 2017 from the Japanese Patent Office in counterpart Application No. 2016-197509.
Communication dated Dec. 6, 2016, from the Japanese Patent Office in counterpart application No. 2015-234029.

* cited by examiner

IMAGING MODULE AND ENDOSCOPE

CROSS REFERENCE TO RELATED APPLICATIONS

This application claims priority from Japanese Patent Application No. 2015-234029 filed on Nov. 30, 2015, the contents of which are incorporated herein by reference in their entirety.

BACKGROUND OF THE INVENTION

Field of the Invention

The present invention relates to an imaging module and an endoscope.

Description of the Related Art

Conventionally, a small imaging module utilizing a solid-state image sensing device is known.

Such imaging module is used in, for example, an endoscope.

As the configuration of the imaging module, a configuration is known which uses a flexible substrate that is provided with a solid-state image sensing device in which a through-hole interconnection is formed (for example, refer to Japanese Unexamined Patent Application, First Publication No. 2011-217887, and hereinbelow referred to as Patent Document 1).

In the imaging module disclosed in Patent Document 1, the flexible substrate is bent toward the opposite side of the imaging surface (toward the rear side of the solid-state image sensing device) from both sides of the portion of the flexible substrate on which the solid-state image sensing device is mounted so that the shape (projected shape) of the flexible substrate does not exceed the region defined by the outer shape of the solid-state image sensing device as seen from the imaging surface of the solid-state image sensing device.

Furthermore, as another configuration of an imaging module, a configuration in which a film is formed on a T-shaped multilayer ceramic substrate is known in which a solid-state image sensing device, an electronic component, a terminal connected to a signal cable, and wirings connected to a solid-state image sensing device are formed on the film (for example, refer to Japanese Unexamined Patent Application, First Publication No. 2000-199863, and hereinbelow referred to as Patent Document 2).

In the step of manufacturing the imaging module using the flexible substrate disclosed in Patent Document 1, for example, there are problems in that the wirings formed on the flexible substrate are likely to be broken and it is difficult to stabilize the shape or the size of the wirings, and the reliability is low.

In the imaging module using the multilayer ceramic substrate which is disclosed in Patent Document 2, for example, the reliability thereof is high; however, it is necessary to provide a quite large number of layers in order to obtain the T-shaped multilayer structure.

Consequently, the multilayer ceramic substrate is not suitable to reduce the size of the imaging module, and there is a problem in that the cost of manufacturing the imaging module remarkably increases.

In other cases, the T-shaped multilayer structure can be manufactured by adhesively attaching a plurality of layers to each other; however, in this case, although the number of layers decreases, it is extremely difficult to maintain the accuracy of the positions at which the layers are adhesively attached to each other.

In the case of employing the above-described step of adhesively attaching the layers, adjacent layers are adhesively attached with an adhesive interposed therebetween. However, the adhesive exudes from between the layers which are attached to each other, and also it is difficult to stabilize the amount of adhesive exuding from between the layers.

As a result, it is not easy to manufacture the T-shaped multilayer structure by the above-described step of adhesively attaching the layers.

SUMMARY OF THE INVENTION

One aspect of the invention was conceived in view of the above-described conventional circumstances and has an object thereof to provide an ultrafine imaging module which can be easily manufactured while maintaining a high degree of reliability, and an endoscope including the imaging module.

In order to realize the aforementioned object, an imaging module according to a first aspect of the invention includes: a solid-state image sensing device including an imaging-device terminal; a connector having a first end face, a second end face located opposite to the first end face, a first side face orthogonal to the first end face, and a second side face orthogonal to the first end face and the first side face, the connector including: a main body serving as an insulating member; a first implanted conductor that is implanted in an inside of the main body; a second implanted conductor that is implanted in an inside of the main body and is longer than the first implanted conductor; a first mounting terminal that is provided on the first end face, is electrically connected to the imaging-device terminal, and constitutes part of the first implanted conductor and part of the second implanted conductor; a first groove that includes a second mounting terminal constituting part of the first implanted conductor and is provided between the first side face and the second side face; a second groove that includes a third mounting terminal constituting part of the second implanted conductor and is provided between the first side face and the second side face; and a third groove that is located between the first groove and the second groove in an extending direction of the main body; and a coaxial cable including: an internal conductor that is provided in the first groove and is electrically connected to the second mounting terminal; a sheath conductor that is provided in the second groove and is electrically connected to the third mounting terminal; and a coated portion that is provided in the third groove.

In the imaging module according to the first aspect of the invention, the first implanted conductor may include: a first inner extending conductor that extends in a direction from the first end face to the second end face; and a first inner connecting conductor that extends in a direction from the first inner extending conductor to the first groove. The first inner connecting conductor may be connected to the second mounting terminal.

In the imaging module according to the first aspect of the invention, the first inner extending conductor and the first inner connecting conductor may constitute the first implanted conductor and may form a first inner curved conductor. The first inner curved conductor may be bent at a first inner bent portion that is located inside the main body.

In the imaging module according to the first aspect of the invention, the second mounting terminal and the first inner connecting conductor may constitute the first implanted conductor and may form a first outer curved conductor. The first outer curved conductor may be bent at a first outer bent portion that is located at an outer portion of the main body which is located further outward than the first inner bent portion.

In the imaging module according to the first aspect of the invention, the second implanted conductor may include: a second inner extending conductor that extends in a direction from the first end face to the second end face; and a second inner connecting conductor that extends in a direction from the second inner extending conductor to the second groove. The second inner connecting conductor may be connected to the third mounting terminal.

In the imaging module according to the first aspect of the invention, the second inner extending conductor and the second inner connecting conductor may constitute the second implanted conductor and may form a second inner curved conductor. The second inner curved conductor may be bent at a second inner bent portion that is located inside the main body.

In the imaging module according to the first aspect of the invention, the third mounting terminal and the second inner connecting conductor may constitute the second implanted conductor and may form a second outer curved conductor. The second outer curved conductor may be bent at a second outer bent portion that is located at an outer portion of the main body which is located further outward than the second inner bent portion.

In the imaging module according to the first aspect of the invention, the second inner connecting conductor may be a branch conductor that is separated from the second implanted conductor at a branch portion, and the branch portion is located inside the main body.

In the imaging module according to the first aspect of the invention, the first mounting terminal may include: a first conductive terminal that constitutes part of the first implanted conductor; and a second conductive terminal that constitutes part of the second implanted conductor.

In the imaging module according to the first aspect of the invention, depth of the third groove may be larger than the depth of the first groove, the depth of the second groove may be larger than the depth of the third groove, the diameter of the coated portion may be larger than the diameter of the internal conductor, and the diameter of the sheath conductor may be larger than the diameter of the coated portion.

The imaging module according to the first aspect of the invention may further include: a fourth mounting terminal provided on the second end face; and an electronic component connected to the fourth mounting terminal.

The imaging module according to the first aspect of the invention may further include a lens unit that forms an image onto a light-receiving face of the solid-state image sensing device.

The imaging module according to the first aspect of the invention may further include an insulating tube that covers part of the coaxial cable and the connector.

The imaging module according to the first aspect of the invention may further include: a housing that covers the solid-state image sensing device, the connector, and part of the coaxial cable; and a resin portion that fills an internal space of the housing.

In the imaging module according to the first aspect of the invention, the length of the internal conductor, the length of the sheath conductor, and the length of the coated portion may be in a range of 0.1 to 1.0 mm.

In the imaging module according to the first aspect of the invention, a distance between a pair of second mounting terminals and a distance between a pair of third mounting terminals may be in a range of 0.1 to 1.0 mm.

The imaging module according to the first aspect of the invention may further include: a fifth mounting terminal that is provided on the second end face and constitutes part of the second implanted conductor; and solder that electrically connects the fifth mounting terminal and the coaxial cable. The fifth mounting terminal may include a terminal-front-end portion, and the terminal-front-end portion may be located at a position apart from a connection surface between the second mounting terminal and the coaxial cable. The coaxial cable may include: an outer coating provided around the periphery of the sheath conductor; and a cable boundary portion located at a boundary between the sheath conductor and the outer coating. The cable boundary portion may be located outside the second end face, and the solder may coat the fifth mounting terminal and the sheath conductor so as to form a curved surface that extends from the terminal-front-end portion to the cable boundary portion.

An endoscope according to a second aspect of the invention includes the imaging module according to the aforementioned first aspect.

Effects of the Invention

As described above, according to the aspect of the invention, it is possible to provide an ultrafine imaging module which can be easily manufactured while maintaining a high degree of reliability.

Furthermore, it is possible to provide an endoscope provided with the ultrafine imaging module.

DETAILED DESCRIPTION OF THE INVENTION

Figure 1:
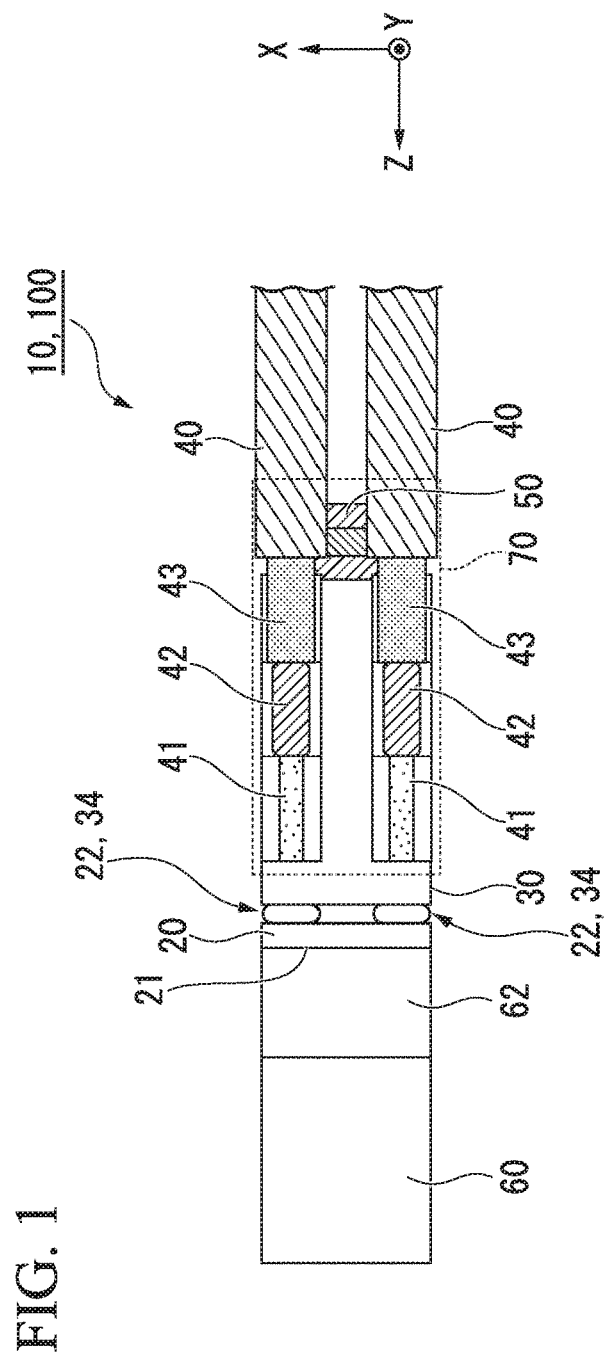
FIG. 1 is a view showing the relevant part of an endoscope according to one embodiment of the invention and is a cross-sectional view showing the configuration of an imaging module.

Hereinafter, an embodiment of the invention will be described with reference to drawings.

In the drawings showing the embodiment of the invention, in order for the respective components to be of understandable size in the drawings, the dimensions and the proportions of the components are modified as needed compared with the real components.

(Endoscope 100)

Figure 2:
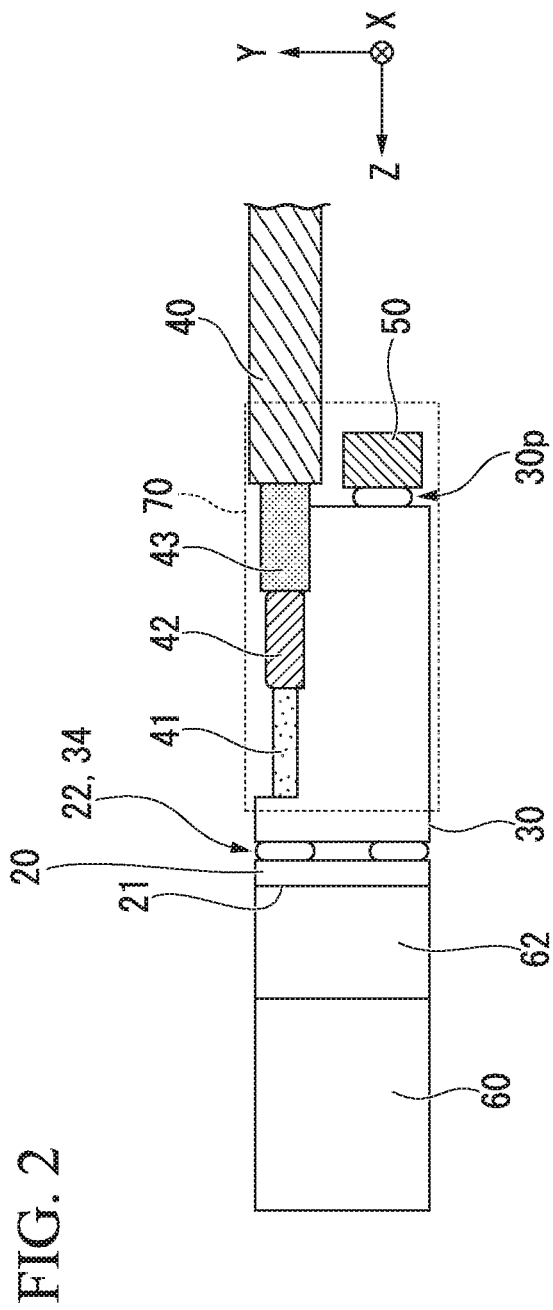
FIG. 2 is a view showing the relevant part of the endoscope according to one embodiment of the invention and is a cross-sectional view showing the configuration of the imaging module.

FIGS. 1 and 2 are views showing the relevant part of the endoscope according to one embodiment of the invention 100 and is a cross-sectional view showing the configuration of an imaging module 10.

Particularly, FIG. 1 is a cross-sectional view as seen in the Y-direction, and FIG. 2 is a cross-sectional view as seen in the X-direction.

The imaging module 10 includes a solid-state image sensing device 20, a connector 30, two coaxial cables 40 (first coaxial cable, second coaxial cable), a capacitor 50 (electronic component), a lens unit 60, and an insulating tube 70.

In the imaging module 10, the solid-state image sensing device 20 is electrically connected to the two coaxial cables 40 through the connector 30.

(Solid-State Image Sensing Device 20)

The solid-state image sensing device 20 includes: a light-receiving face 21 which is located at the upper surface of the solid-state image sensing device 20; and imaging-device terminals 22 which are provided on the lower surface of the solid-state image sensing device 20.

The lens unit 60 is mounted on the light-receiving face 21.

The imaging-device terminals 22 are terminals that are to be connected to mounting pads (which will be described below) provided on the upper surface 30t of the connector 30.

As the solid-state image sensing device 20, for example, a CMOS (complementary metal oxide semiconductor) is preferably used.

The lens unit 60 is configured to include an object lens (not shown in the figure) incorporated into a cylindrical lens barrel (not shown in the figure).

The optical axis of the lens unit 60 is positionally-fixed to the light-receiving face 21 of the solid-state image sensing device 20.

The end of the lens barrel in the axis direction thereof is fixed to a cover member 62.

Light is incident to the front side of the lens unit 60 (left side of FIG. 1), the lenses provided in the lens barrel guide the light, and the lens unit 60 forms an image onto the light-receiving face 21 of the solid-state image sensing device 20 from the guided light.

The insulating tube 70 covers at least the connector 30 and part of the coaxial cable 40 connected to the connector 30.

In the embodiment, the capacitor 50 is connected to the connector 30. The insulating tube 70 collectively covers the connector 30, part of the coaxial cable 40, and the capacitor 50.

Here, part of the coaxial cable 40 means the region that includes not only the region (exposed region) on which an internal conductor 41, a coated portion 42, and a sheath conductor 43 are formed but also the region which includes an outer coating 44 (which will be described below) located close to the connector 30.

Particularly, in the embodiment, as shown in FIG. 1, the insulating tube 70 covers the coaxial cable 40 so as to protrude from the end portion of the capacitor 50 to the outside (right side).

With this configuration, the insulating tube 70 protects the connector 30, the coaxial cable 40, and the capacitor 50 and can realize a high degree of insulation property.

The insulating tube 70 is a resin tube having electrical insulation.

As the insulating tube 70, a heat shrinkable tube is used.

As a material used to form the insulating tube 70, for example: polyimide resin; silicone resin; polyolefin resins such as polyethylene terephthalate (PET) resin, nylon resin, polyethylene resin, or polypropylene resin; or fluorine resins such as polytetrafluoroethylene (PTFE) resin is used.

(Connector 30)

Figure 3:
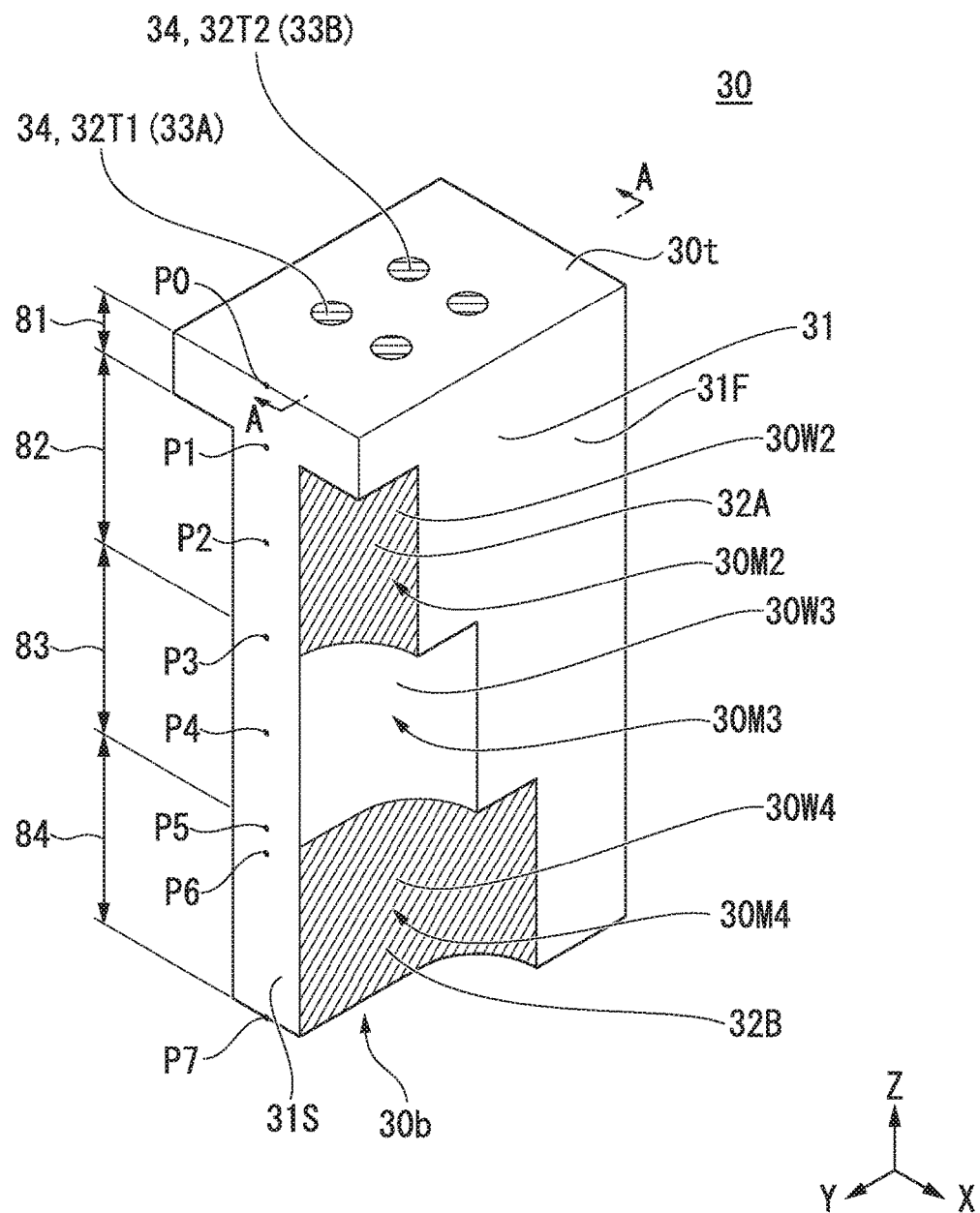
FIG. 3 is a perspective view showing a connector that constitutes the imaging module according to one embodiment of the invention.

FIG. 3 is a perspective view showing the connector 30.

Figure 4:
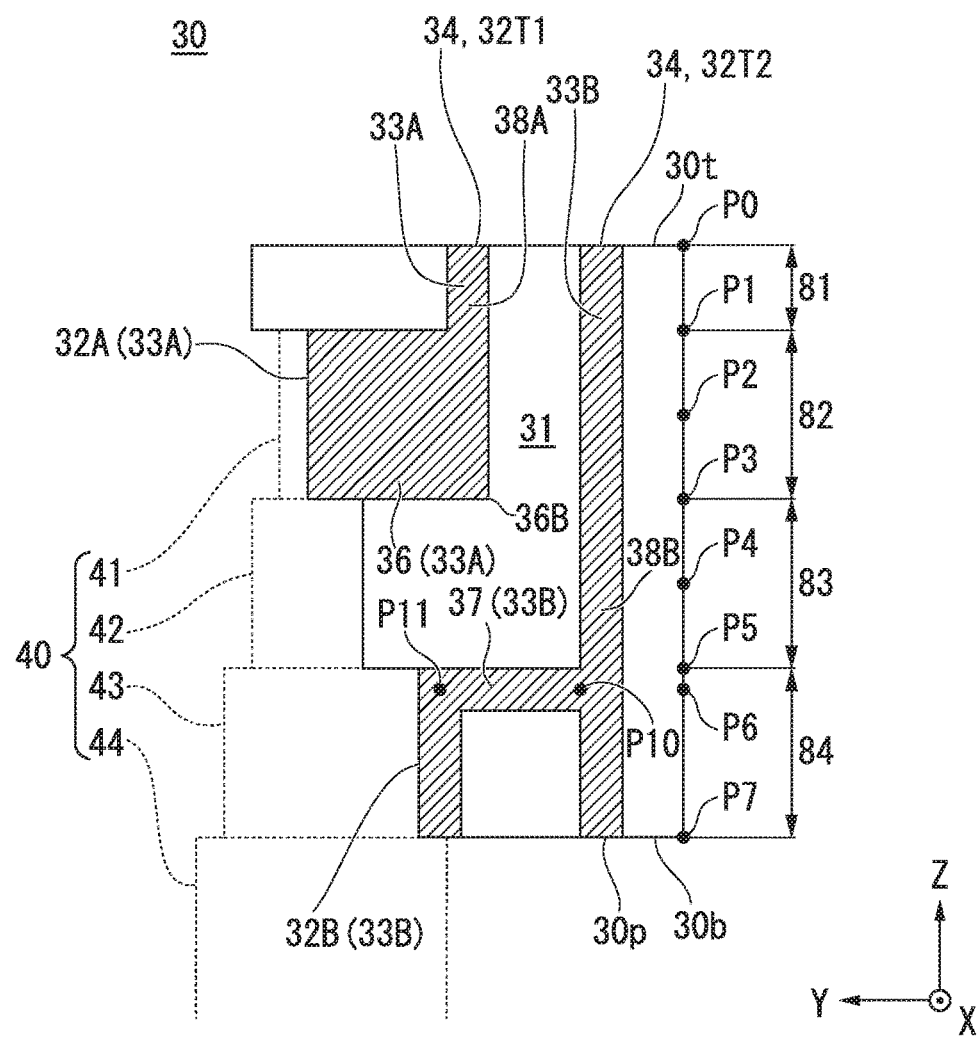
FIG. 4 is an explanatory view showing the positional relationship between the connector and a coaxial cable which constitute the imaging module according to one embodiment of the invention and is a cross-sectional view taken along the line A-A indicated by FIG. 3.

FIG. 4 is an explanatory view showing the positional relationship between the connector 30 and the coaxial cable 40 and is a cross-sectional view taken along the line A-A indicated by FIG. 3.

Figure 5:
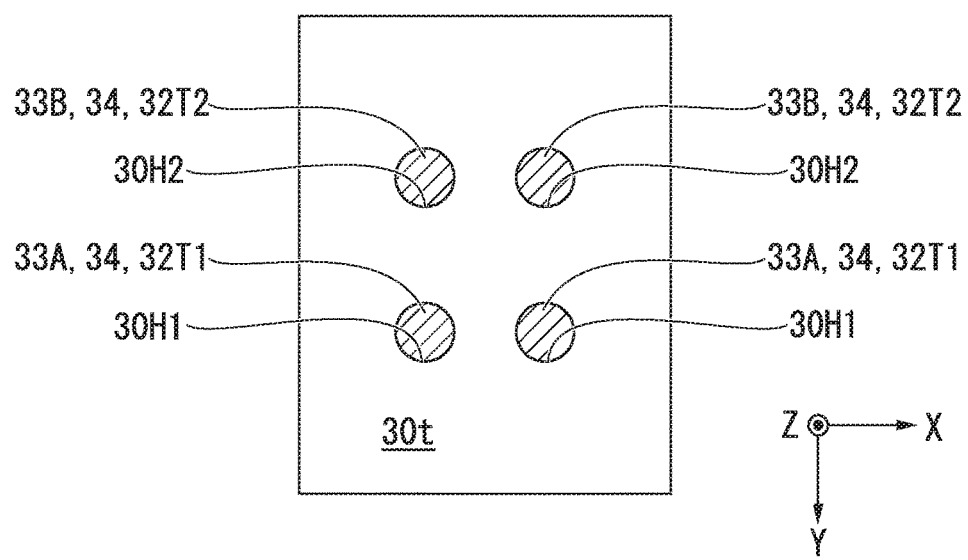
FIG. 5 is a top view showing the connector that constitutes the imaging module according to one embodiment of the invention.

FIG. 5 is a top view showing the upper surface of the connector 30.

Figure 6:
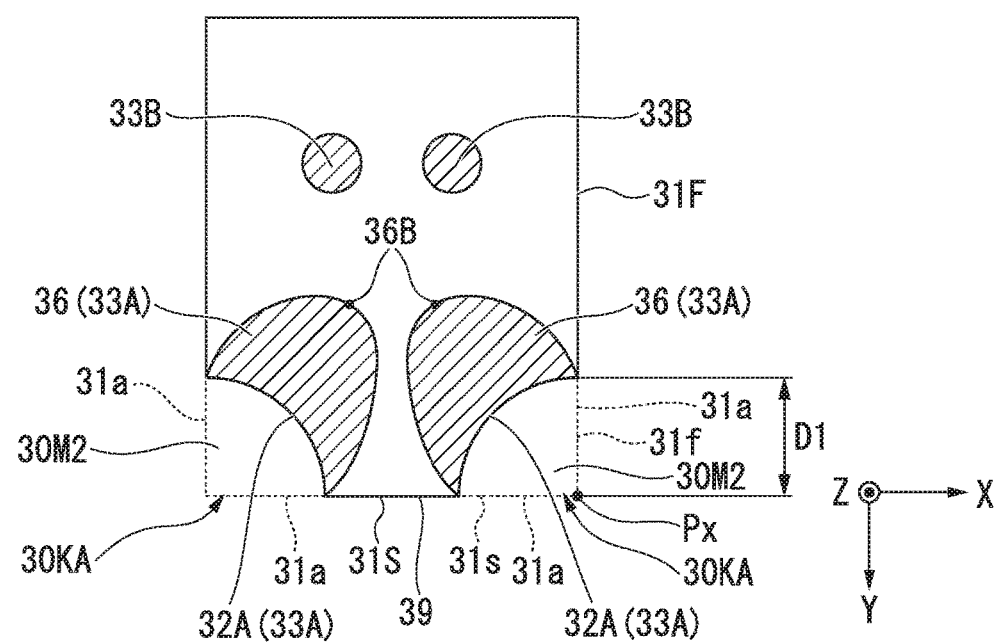
FIG. 6 is a cross-sectional view showing the connector that constitutes the imaging module according to one embodiment of the invention.

FIG. 6 is a cross-sectional view showing the connector 30 at the point P2 shown in FIGS. 3 and 4.

Figure 7:
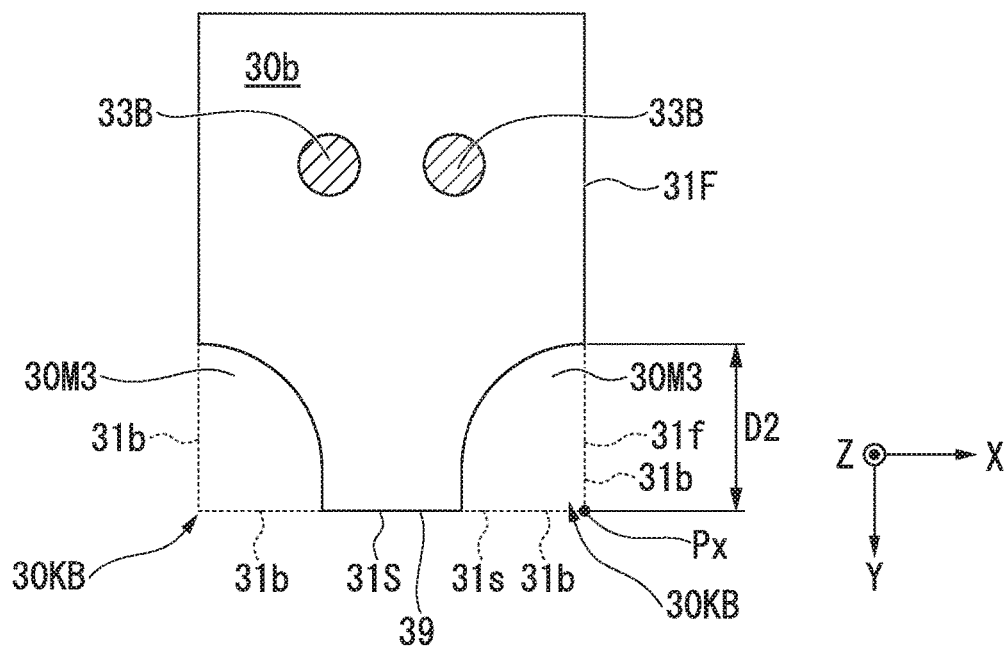
FIG. 7 is a cross-sectional view showing the connector that constitutes the imaging module according to one embodiment of the invention.

FIG. 7 is a cross-sectional view showing the connector 30 at the point P4 shown in FIGS. 3 and 4.

Figure 8:
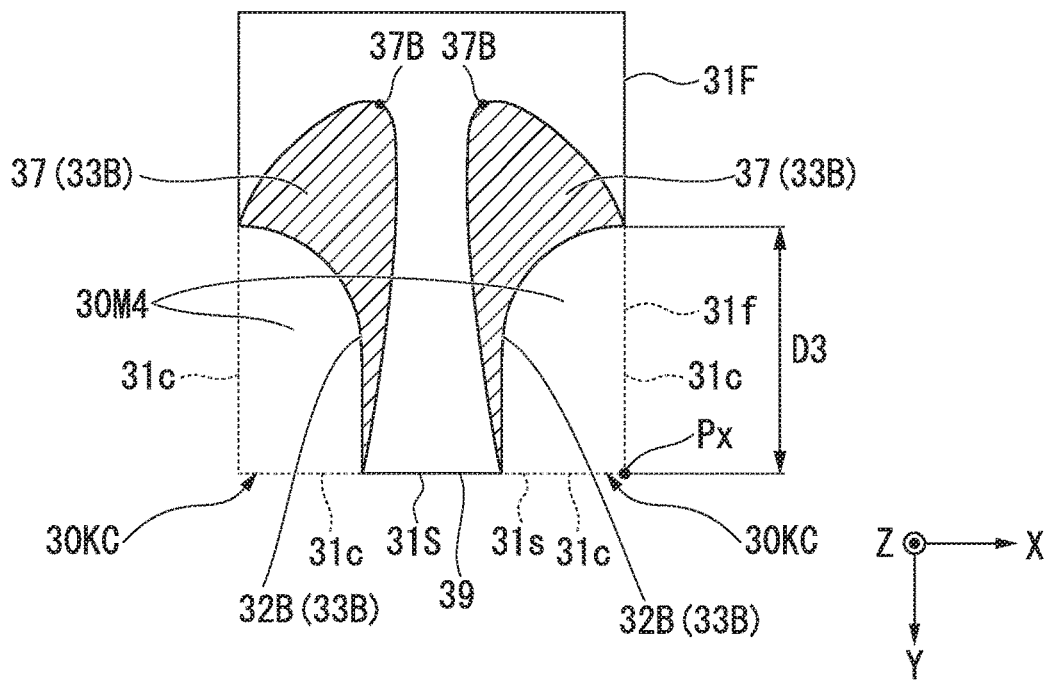
FIG. 8 is a cross-sectional view showing the connector that constitutes the imaging module according to one embodiment of the invention.

FIG. 8 is a cross-sectional view showing the connector 30 at the point P6 shown in FIGS. 3 and 4.

Figure 9:
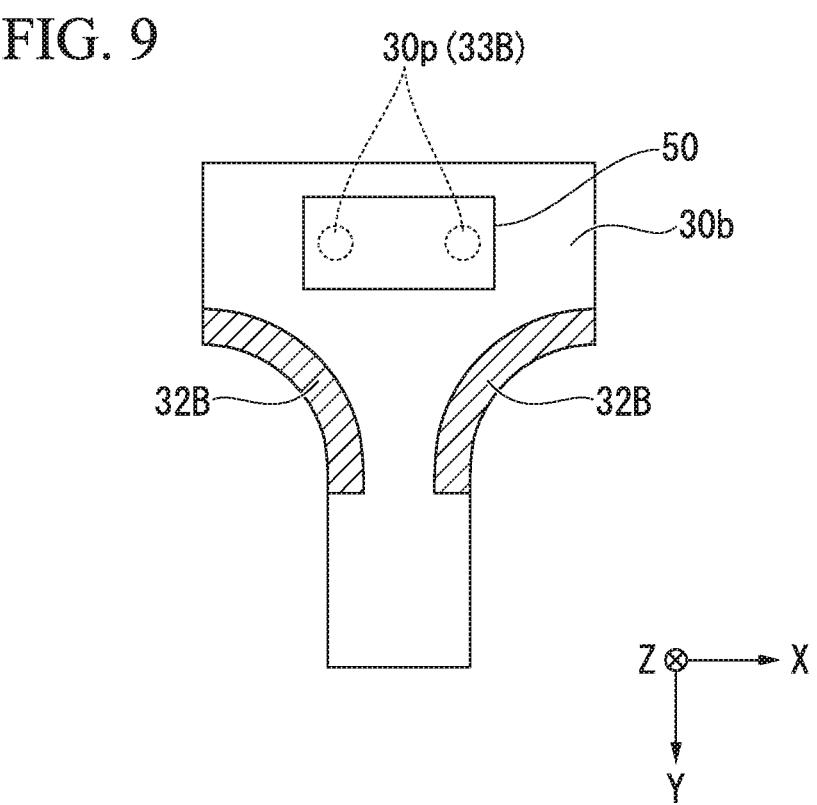
FIG. 9 is a bottom view showing the connector that constitutes the imaging module according to one embodiment of the invention.

FIG. 9 is a bottom view showing the lower surface of the connector 30.

In the examples shown in FIGS. 3 and 4, a plurality of points P0 to P7 that align in the Z-direction are shown in the connector 30.

In the explanation described below, the upper surface, the cross-sectional surfaces, and the lower surface of the connector 30 at the points P0 to P7 will be described, and furthermore, the region between two points selected from the points P0 to P7 will be described.

The region of the connector 30 located between the point P0 and the point P1 will be referred to as the first region 81.

The region of the connector 30 located between the point P1 and the point P3 will be referred to as the second region 82.

The region of the connector 30 located between the point P3 and the point P5 will be referred to as the third region 83.

The region of the connector 30 located between the point P5 and the point P7 will be referred to as the fourth region 84.

Particularly, the points P0 to P7 are the points which are shown in order to explain the configuration of the connector 30 serving as an integrally-formed body, for example, and the points P0 to P7 do not mean that the connector 30 is formed of a plurality of members.

As shown in FIGS. 3 and 4, the length (the X-direction and the Y-direction) of one side of the upper surface 30t of the connector 30 is less than or equal to 2 mm.

The connector 30 includes: a main body 31 that functions as an insulator (insulating member); and an implanted conductor 33A (first implanted conductor) and an implanted conductor 33B (second implanted conductor) which are provided inside the main body 31.

The main body 31 has: an upper surface 30t (fast end face); a lower surface 30b (second end face) located on the opposite side of the upper surface 30t; a first side face 31F orthogonal to the upper surface 30t; and a second side face 31S orthogonal to the upper surface 30t and the first side face 31F.

The implanted conductor 33A (first inner extending conductor) and the implanted conductor 33B (second inner extending conductor) extend in the extending direction of the main body 31 (the Z-direction, direction from the first end face to the second end face).

Regarding the length of the implanted conductors in the Z-direction, the implanted conductor 33B is longer than the implanted conductor 33A.

In the example shown in FIG. 4, the implanted conductor 33A extends in the Z-direction from the upper surface 30t (point P0) so as to reach the lower end of the second region 82 (point P3) and is not provided in the third region 83 and the fourth region 84.

On the other hand, the implanted conductor 33B (inner extending conductor) extends in the Z-direction from the upper surface 30t (point P0) so as to reach the lower end of the fourth region 84 (point P7) and is provided so as to penetrate through the main body 31 in the direction from the upper surface 30t to the lower surface 30b.

The invention is not limited to the wiring structure shown in FIG. 4.

It is not necessarily the case that the implanted conductor 33A extends so as to reach the lower end of the second region 82 (point P3), and the implanted conductor 33A may have a three-dimensional conductor pattern that is bent inside the connector 30.

Similarly, it is not necessarily the case that the implanted conductor 33B extends so as to reach the lower surface 30b, and the implanted conductor 33B may have a three-dimensional conductor pattern that is bent inside the connector 30.

Examples of three-dimensional wiring structures of the implanted conductor 33A and the implanted conductor 33B will be described later.

Next, the configuration of each of the first region 81, the second region 82, the third region 83, and the fourth region 84 in the connector 30 will be described.

(First Region 81)

The first region 81 is located at the top end of the connector 30 in the Z-direction and faces the solid-state image sensing device 20.

The upper surface 30t of the first region 81 has two first upper surface exposed portions 32T1 (first conductive terminal, first mounting terminal) and two second upper surface exposed portions 32T2 (second conductive terminal, first mounting terminal).

That is, four upper surface exposed portions 32T are provided on the upper surface 30t.

Each of the four upper surface exposed portions 32T is a mounting pad 34 (first mounting terminal) which is to be connected to the imaging-device terminal 22 of the solid-state image sensing device 20.

By means of this structure, when the solid-state image sensing device 20 is mounted on the upper surface 30t, the imaging-device terminals 22 are electrically connected to the mounting pads 34.

Through holes 30H1 and 30H2 which extend in the Z-direction are provided inside the first region 81 at the positions corresponding to the first upper surface exposed portion 32T1 and the second upper surface exposed portion 32T2, respectively.

Here, the through hole 30H1 is filled with the implanted conductor 33A.

The through hole 30H2 is filled with the implanted conductor 33B.

(Second Region 82)

As shown in FIGS. 4 and 6, inner connecting conductors 36 (first inner connecting conductor, first implanted conductor) are provided in the second region 82.

The inner connecting conductor 36 is electrically connected to the implanted conductor 33A.

The inner connecting conductor 36 constitutes part of the implanted conductor 33A and is integrated with the implanted conductor 33A.

The inner connecting conductor 36 protrudes from the implanted conductor 33A in the direction orthogonal to the extending direction of the main body 31.

That is, the inner connecting conductors 36 extend from the implanted conductors 33A toward the outside (groove 30M2 which will be described later) of the main body 31.

The inner connecting conductors 36 have implanted terminals 32A (second mounting terminal, first implanted conductor).

That is, the implanted terminal 32A is connected to the inner connecting conductor 36.

The implanted terminals 32A are exposed to the outside of the connector 30 (inside of the grooves 30M2).

The grooves 30M2 (first groove) are formed in the second region 82 by removing part of the main body 31 and part of the implanted conductor 33A.

The implanted terminals 32A are exposed to the grooves 30M2.

Specifically, two grooves 30M2 are provided in the second region 82, and the implanted terminal 32A is exposed to each groove 30M2.

That is, the second region 82 includes two (a pair of) the implanted terminals 32A.

The distance between the two implanted terminals 32A is in a range of 0.1 to 1.0 mm.

The implanted terminal 32A constitutes part of the implanted conductor 33A and extends in the Z-direction from the upper end surface of the second region 82 (boundary between the first region 81 and the second region 82 (point P1)) to the lower end surface of the second region 82 (boundary between the second region 82 and the third region 83 (point P3)).

In the Y-direction of the groove 30M2, the depth of the groove 30M2 from the side face 39 on which the groove 30M2 is formed is represented as D1.

The implanted conductor 33A and the implanted conductor 33B are provided inside the second region 82 so as to extend in the extending direction of the main body 31 (the Z-direction).

As shown in FIG. 4, the inner connecting conductor 36 extends in the Y-direction.

That is, the extending direction of the inner connecting conductor 36 is different from the extending direction (the Z-direction) of an inner extending conductor 38A (first inner extending conductor, implanted conductor 33A).

The upper surface of the inner connecting conductor 36 is located at the point P1, that is, at the upper end of the second region 82.

The inner extending conductor 38A, the inner connecting conductor 36, and the implanted terminal 32A which constitute the implanted conductor 33A form a three-dimensional structure that is integrally formed inside the main body 31.

In the example shown in FIG. 6, the positions of the inner connecting conductors 36 (the positions in the X-direction and in the Y-direction) overlaps the mounting pads 34.

The width of the inner connecting conductor 36 gradually widens in the direction from the back end 36B of the inner connecting conductor 36 (the end portion of the inner connecting conductor 36 located inside the main body 31) to the implanted terminal 32A.

In other words, the plane pattern of the inner connecting conductor 36 is formed in a substantially fan shape.

The invention is not limited to such substantially fan shape as the shape of the inner connecting conductor 36.

The inner connecting conductor 36 may extend from the inner extending conductor 38A (implanted conductor 33A) to the groove 30M2.

The shape of the inner connecting conductor 36 is not limited.

The implanted terminals 32A are exposed to the outside of the second region 82 by removing (grinding) the corner regions 30KA of the second region 82, and each implanted terminal has a curved surface corresponding to the shape of the grinding tool.

The implanted terminal 32A extend in the Z-direction.

As shown in FIG. 4, the internal conductor 41 of the coaxial cable 40 is connected to the implanted terminal 32A.

In FIG. 6, the dotted line 31a shows the outer shape of the second region 82 before the corner regions 30KA are removed.

In a state before the corner regions 30KA are removed, the implanted terminals 32A are implanted in the corner regions 30KA.

More specifically, before the corner regions 30KA are removed, the corner regions 30KA are filled with implant members which become the implanted terminals 32A and insulating members that constitute the main body 31.

By grinding the above-mentioned implant members and insulating members which are located in the corner regions 30KA, that is, by removing the portions indicated by the dotted line 31a, the implanted terminals 32A are formed.

In other words, the implanted terminal 32A can be referred to as an exposed terminal at which part of the aforementioned inner connecting conductor 36 is exposed.

As a result of grinding the corner regions 30KA, the grooves 30M2 are formed in the second region 82 of the connector 30, and the implanted terminals 32A are provided on the wall surfaces 30W2 of the grooves 30M2.

The implanted terminals 32A are exposed to the grooves 30M2.

The wall surface 30W2 of the groove 30M2 is a grinding surface formed by grinding and can be said to be a surface having a grinding trace that occurs due to contact between a grinding tool and the main body 31.

Before the corner regions 30KA are removed, the corner regions 30KA may be filled with the implant member that becomes the implanted terminal 32A.

Even in this case, the grooves 30M2 are formed by the aforementioned grinding.

Particularly, the groove 30M2 in which the implanted terminal 32A is formed is provided at the position corresponding to the position of the corner region 30KA.

Specifically, the second region 82 has the first side face 31F (surface perpendicular to the X-direction) and the second side face 31S (surface perpendicular to the Y-direction).

The first side face 31F and the second side face 31S are the surfaces orthogonal to the upper surface 30t of the connector 30 (surface orthogonal to the Z-direction).

The groove 30M2 is provided between the first side face 31F and the second side face 31S.

As indicated by the dotted line shown in FIG. 6, the first virtual extension surface 31f of the first side face 31F (the first virtual extension surface 31f coincides with the first side face 31F on the same plane) intersects with the second virtual extension surface 31s of the second side face 31S (the second virtual extension surface 31s coincides with the second side face 31S on the same plane) at the intersection Px.

That is, the space surrounded by the wall surface 30W2 of the groove 30M2, the first virtual extension surface 31f, and the second virtual extension surface 31s corresponds to the groove 30M2.

As described later, the implanted terminal 32A is electrically connected to the internal conductor 41 of the coaxial cable 40 inside the groove 30M2.

On the other hand, in the second region 82, the implanted conductor 33B is not ground and is located inside the second region 82.

That is, the implanted conductor 33B extends in the Z-direction from the upper end surface of the second region 82 (boundary between the first region 81 and the second region 82 (point P1)) to the lower end surface of the second region 82 (boundary between the second region 82 and the third region 83 (point P3)).

(Third Region 83)

As shown in FIG. 7, grooves 30M3 (third groove) that are obtained by removing part of the main body 31 are formed in the third region 83.

The groove 30M3 is located between the groove 30M2 and groove 30M4 in the Z-direction.

The grooves 30M3 are formed by only removing part of the main body 31, and the groove 30M3 does not have the structure such that the implanted conductor 33B is partially removed.

In the Y-direction of the groove 30M3, the depth of the groove 30M3 from the side face 39 on which the groove 30M3 is formed is represented as D2. The depth D2 is larger than the depth D1 of the above-mentioned groove 30M2.

The grooves 30M3 are the space in which the coated portions 42 of the coaxial cable 40 are arranged.

In FIG. 7, the dotted line 31b of the corner regions 30KB shows the outer shape of the third region 83 in the corner regions 30KB before the corner regions 30KB are removed.

As a result of grinding the corner regions 30KB, that is, as a result of removing the portions indicated by the dotted line 31b, the grooves 30M3 are formed.

The wall surface 30W3 of the groove 30M3 is a grinding surface formed by grinding and can be said to be a surface having a grinding trace that occurs due to contact between a grinding tool and the main body 31.

Particularly, the groove 30M3 is provided at the position corresponding to the position of the corner region 30KB.

Specifically, the third region 83 has the first side face 31F (surface perpendicular to the X-direction) and the second side face 31S (surface perpendicular to the Y-direction).

The first side face 31F and the second side face 31S are the surfaces orthogonal to the upper surface 30t of the connector 30 (surface orthogonal to the Z-direction).

The groove 30M3 is provided between the first side face 31F and the second side face 31S.

As indicated by the dotted line shown in FIG. 7, the first virtual extension surface 31f of the first side face 31F (the first virtual extension surface 31f coincides with the first side face 31F on the same plane) intersects with the second virtual extension surface 31s of the second side face 31S (the second virtual extension surface 31s coincides with the second side face 31S on the same plane) at the intersection Px.

That is, the space surrounded by the wall surface 30W3 of the groove 30M3, the first virtual extension surface 31f, and the second virtual extension surface 31s corresponds to the groove 30M3.

On the other hand, in the third region 83, the implanted conductor 33B is not ground and is located inside the third region 83.

That is, the implanted conductor 33B extends in the Z-direction from the upper end surface of the third region 83 (boundary between the second region 82 and the third region 83 (point P3)) to the lower end surface of the third region 83 (boundary between the third region 83 and the fourth region 84 (point P5)).

(Fourth Region 84)

As shown in FIGS. 4 and 8, inner connecting conductors 37 (second inner connecting conductor, second implanted conductor) are provided in the fourth region 84.

The inner connecting conductor 37 is electrically connected to the implanted conductor 33B.

The inner connecting conductor 37 constitutes part of the implanted conductor 33B and is integrated with the implanted conductor 33B.

The inner connecting conductor 37 protrudes from the implanted conductor 33B in the direction orthogonal to the extending direction of the main body 31.

That is, the inner connecting conductors 37 extend from the implanted conductors 33B toward the outside (groove 30M4 which will be described later) of the main body 31.

The inner connecting conductors 37 have implanted terminals 32B (third mounting terminal, second implanted conductor).

That is, the implanted terminal 32B is connected to the inner connecting conductor 37.

The implanted terminals 32B are exposed to the outside of the connector 30 (inside of the grooves 30M4).

The grooves 30M4 (second groove) are formed in the fourth region 84 by removing part of the main body 31 and part of the implanted conductor 33B.

The implanted terminals 32B are exposed to the grooves 30M4.

Specifically, two grooves 30M4 are provided in the fourth region 84, and the implanted terminal 32B is exposed to each groove 30M4.

That is, the fourth region 84 includes two (a pair of) the implanted terminals 32B.

The distance between the two implanted terminals 32B is in a range of 0.1 to 1.0 mm.

The implanted terminal 32B constitutes part of the implanted conductor 33B and extends in the Z-direction from the upper end surface of the fourth region 84 (boundary between the third region 83 and the fourth region 84 (point P5)) to the lower end surface of the fourth region 84 (the lower surface 30b, the point P7).

In the Y-direction of the groove 30M4, the depth of the groove 30M4 from the side face 39 on which the groove 30M4 is formed is represented as D3. The depth D3 is larger than the depth D2 of the above-mentioned groove 30M3.

The implanted conductor 33B is provided inside the fourth region 84 so as to extend in the extending direction of the main body 31 (the Z-direction).

As shown in FIG. 4, the inner connecting conductor 37 extends in the Y-direction.

That is, the extending direction of the inner connecting conductor 37 is different from the extending direction (the Z-direction) of an inner extending conductor 38B (second inner extending conductor, implanted conductor 33B).

The upper surface of the inner connecting conductor 37 is located at the point P5, that is, at the upper end of the fourth region 84.

The inner connecting conductor 37 is connected to the inner extending conductor 38B at the first end P10 of the inner connecting conductor 37, and the inner connecting conductor 37 is connected to the implanted terminal 32B at the second end P11 of the inner connecting conductor 37.

Here, the first end P10 is one of the ends of the inner connecting conductor 37 which is located inside the main body 31.

The second end P11 is located on the opposite side of the first end P10 and is one of the ends of the inner connecting conductor 37 which is located at the position close to the implanted terminal 32B (the end that is located at the position close to the outside of the main body 31).

The inner extending conductor 38B, the inner connecting conductor 37, and the implanted terminal 32B which constitute the implanted conductor 33B form a three-dimensional structure that is integrally formed inside the main body 31.

In the three-dimensional structure, the inner connecting conductor 37 is separated from the implanted conductor 33B at the point P10 (the branch portion that is located inside the main body 31).

That is, the inner connecting conductor 37 is that a branch conductor is provided inside the main body 31.

The inner connecting conductor 37 and the implanted terminal 32B form a second outer curved conductor that is bent at the point P11 (bent portion).

Here, the point P11 is a second outer bent portion that is located at the outer portion of the main body 31 which is located further outward than the point P10 (branch portion).

In the example shown in FIG. 8, the positions of the inner connecting conductors 37 (the positions in the X-direction and in the Y-direction) overlaps the mounting pads 34.

The width of the inner connecting conductor 37 gradually widens in the direction from the back end 37B of the inner connecting conductor 37 (the end portion of the inner connecting conductor 37 located inside the main body 31) to the implanted terminal 32B.

In other words, the plane pattern of the inner connecting conductor 37 is formed in a substantially fan shape.

The invention is not limited to such substantially fan shape as the shape of the inner connecting conductor 37.

The inner connecting conductor 37 may extend from the inner extending conductor 38B (implanted conductor 33B) to the groove 30M4.

The shape of the inner connecting conductor 37 is not limited.

The implanted terminals 32B are exposed to the outside of the fourth region 84 by removing (grinding) the corner regions 30KC of the fourth region 84, and each implanted terminal has a curved surface corresponding to the shape of the grinding tool.

The implanted terminal 32B extends in the Z-direction.

As shown in FIG. 4, the sheath conductor 43 of the coaxial cable 40 is connected to the implanted terminal 32B.

In FIG. 8, the dotted line 31c shows the outer shape of the fourth region 84 before the corner regions 30KC are removed.

In a state before the corner regions 30KC are removed, the implanted terminals 32B are implanted in the corner regions 30KC.

More specifically, before the corner regions 30KC are removed, the corner regions 30KC are filled with implant members which become the implanted terminals 32B and insulating members that constitute the main body 31.

By grinding the above-mentioned implant members and insulating members which are located in the corner regions 30KC, that is, by removing the portions indicated by the dotted line 31c, the implanted terminals 32B are formed.

In other words, the implanted terminal 32B can be referred to as an exposed terminal at which part of the aforementioned inner connecting conductor 37 is exposed.

As a result of grinding the corner regions 30KC, the grooves 30M4 are formed in the fourth region 84 of the connector 30, and the implanted terminals 32B are provided on the wall surfaces 30W4 of the grooves 30M4.

The implanted terminals 32B are exposed to the grooves 30M4.

The wall surface 30W4 of the groove 30M4 is a grinding surface formed by grinding and can be said to be a surface having a grinding trace that occurs due to contact between a grinding tool and the main body 31.

Before the corner regions 30KC are removed, the corner regions 30KC may be filled with the implant member that becomes the implanted terminal 32B.

Even in this case, the grooves 30M4 are formed by the aforementioned grinding.

Particularly, the groove 30M4 in which the implanted terminal 32B is formed is provided at the position corresponding to the position of the corner region 30KC.

Specifically, the fourth region 84 has the first side face 31F (surface perpendicular to the X-direction) and the second side face 31S (surface perpendicular to the Y-direction).

The first side face 31F and the second side face 31S are the surfaces orthogonal to the upper surface 30t of the connector 30 (surface orthogonal to the Z-direction).

The groove 30M4 is provided between the first side face 31F and the second side face 31S.

As indicated by the dotted line shown in FIG. 8, the first virtual extension surface 31f of the first side face 31F (the first virtual extension surface 31f coincides with the first side face 31F on the same plane) intersects with the second virtual extension surface 31s of the second side face 31S (the second virtual extension surface 31s coincides with the second side face 31S on the same plane) at the intersection Px.

That is, the space surrounded by the wall surface 30W4 of the groove 30M4, the first virtual extension surface 31f, and the second virtual extension surface 31s corresponds to the groove 30M4.

As described later, the implanted terminal 32B is electrically connected to the sheath conductor 43 of the coaxial cable 40 inside the groove 30M4.

The implanted terminals 32A and 32B have a structure which is completely different from that of the coated film formed on a substrate surface by use of a publicly known film formation method.

That is, the implanted terminals 32A and 32B are formed by implanting metal conductors in the inside region that is located inside the main body 31.

This means that the implanted terminals 32A and 32B are different from the thin film which is formed on the surface of the main body 31 by a publicly known film formation.

As a material used to form the main body 31, a publicly known material is used.

For example, a sintered member such as alumina or LTCC may be used.

As a material used to form the main body 31, for example, a glass epoxy substrate (FR-4), a ferrule substrate, a silicon substrate, or a glass substrate may be adopted.

As a material used to form the implanted terminals 32A and 32B, a publicly known material is used.

For example, copper, silver, nickel, gold, tungsten, or the like may be adopted as a material used to form the implanted terminals 32A and 32B.

(Coaxial Cable 40)

As shown in FIG. 1, each of the two coaxial cables 40 includes the internal conductor 41, the coated portion 42 (insulator), and the sheath conductor 43.

The length of the internal conductor 41, the length of the sheath conductor 43, the length of the coated portion 42 located between the internal conductor 41 and the sheath conductor 43 are in a range of 0.1 to 1.0 mm.

The internal conductor 41 is arranged in the groove 30M2 and is connected to the implanted terminal 32A by solder 35.

The coated portion 42 is arranged in the groove 30M3.

Figure 10:
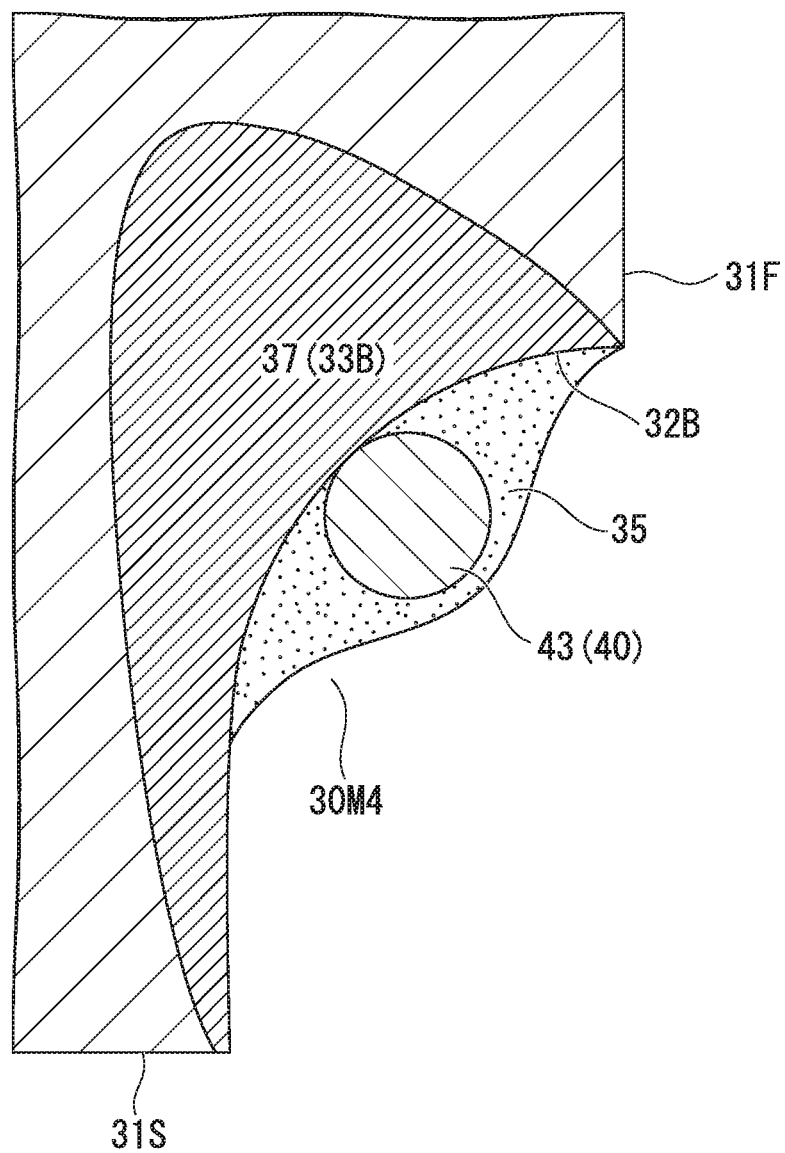
FIG. 10 is a partial cross-sectional view showing a state where an implanted terminal is connected to a conductor of the coaxial cable by solder in the connector that constitutes the imaging module according to one embodiment of the invention.

The sheath conductor 43 is arranged in the groove 30M4 and is connected to the implanted terminal 32B by solder 35 (refer to FIG. 10).

For example, the configuration having the coated portion 42 that is in contact with the wall surface 30W3 is shown in FIGS. 2 and 4; however, the invention is not limited to this configuration.

A space may be formed between the coated portion 42 and the wall surface 30W3.

The diameter of the coated portion 42 is larger than the diameter of the internal conductor 41, and the diameter of the sheath conductor 43 is larger than the diameter of the coated portion 42.

In contrast, the depth D2 of the groove 30M3 in which the coated portion 42 is arranged is larger than the depth D1 of the groove 30M2 in which the internal conductor 41 is arranged.

The depth D3 of the groove 30M4 in which the sheath conductor 43 is arranged is larger than the depth D2 of the groove 30M3 in which the coated portion 42 is arranged.

Consequently, even in the case where the coaxial cable 40 is connected to the connector 30, irregularities due to difference in the diameters of the internal conductor 41, the coated portion 42, and the sheath conductor 43 do not occur on the connector 30.

Accordingly, deformation is prevented from occurring in the internal conductor 41, the coated portion 42, and the sheath conductor 43, and it is possible to stably connect the coaxial cable 40 and the connector 30.

Furthermore, it is possible to easily connect the coaxial cable 40 and the connector 30.

It is preferable to determine the depths D1, D2, and D3 of the grooves 30M2, 30M3, and 30M4 so that the center lines of the internal conductor 41, the coated portion 42, and the sheath conductor 43 align each other.

For this reason, when the coaxial cable 40 is connected to the connector 30, since it is not necessary to bend the coaxial cable 40, it is possible to further improve the connection reliability therebetween.

In the connector 30 having the aforementioned first region 81, the second region 82, the third region 83, and the fourth region 84 which are integrally formed in one body, the first upper surface exposed portions 32T1 are electrically connected to the internal conductors 41 of the coaxial cables 40 through the implanted conductors 33A.

The second upper surface exposed portions 32T2 are electrically connected to the sheath conductor 43 of the coaxial cable 40.

Since the first upper surface exposed portion 32T1 and the second upper surface exposed portion 32T2 are terminals that are to be connected to the solid-state image sensing device 20, it is possible to electrically connect coaxial cable 40 and the solid-state image sensing device 20 through the connector 30.

Next, a structure in which the sheath conductor 43 is connected to the implanted terminal 32B through the solder 35 will be described with reference to FIG. 10.

FIG. 10 is a partial cross-sectional view showing a state where the implanted terminal 32B is connected to the sheath conductor 43 by use of the solder 35.

As shown in FIG. 10, the side face of the implanted terminal 32B, that is, the implanted terminal 32B of the implanted terminal 32B is used as a mount surface, and the sheath conductor 43 is mounted on this mount surface.

The solder 35 is formed so as to coat the sheath conductor 43 and the implanted terminal 32B in a state of connecting the sheath conductor 43 and the implanted terminal 32B.

Particularly, since the implanted terminal 32B has a curved surface, the sheath conductor 43 is supported by the curved surface of the implanted terminal 32B, it is possible to easily fix the position of the sheath conductor 43 when the sheath conductor 43 is arranged on the implanted terminal 32B.

Also, since the solder 35 stays on the curved surface of the implanted terminal 32B when the sheath conductor 43 and the implanted terminal 32B are soldered, it is possible to prevent the solder 35 from flowing to the outside of the main body 31.

That is, the implanted terminal 32B having the curved surface functions as a solder receiver.

Similarly, the internal conductor 41 electrically connected to the implanted terminal 32A through the solder 35.

Since the implanted terminal 32A also has a curved surface, it functions as a solder receiver, and it is possible to prevent the solder 35 from flowing to the outside of the main body 31.

As shown in FIG. 9, mounting pads 30p (fourth mounting terminal) are provided on the lower surface 30b of the connector 30.

The capacitor 50 is connected to the mounting pads 30p.

Each of the mounting pads 30p is the end portion of the implanted conductor 33B that penetrates through the first region 81, the second region 82, the third region 83, and the fourth region 84 of the connector 30.

That is, the position of the implanted conductors 33B coincides with the position of the mounting pad 30p in the X-direction and the Y-direction.

Consequently, the solid-state image sensing device 20, the capacitor 50, and the coaxial cable 40 are electrically connected to each other through the implanted conductors, the mounting pads 34, and the mounting pads 30p which are provided inside the above-described connector 30.

In other cases, the electronic component which is mounted on the mounting pads 30p is not limited to the capacitor 50, an electrical resistance or a coil may be mounted on the mounting pads 30p.

In the above-described embodiment, the case is described where the position of the implanted conductor 33B coincides with the position of the mounting pad 30p in the X-direction and in the Y-direction; however, the invention is not limited to this embodiment.

For example, wiring serving as an electroconductive member which is different from the implanted conductor 33B and the mounting pad 30p may be formed on the lower surface 30b.

In this configuration, the mounting pad 30p is electrically connected to the implanted conductor 33B through the wiring.

This wiring is configures part of the implanted conductor that is implanted in the inside of the connector 30.

This wiring is formed by grinding the end face of the connector 30 and by exposing the lower surface 30b to the outside of the connector 30.

This wiring may be made of the same electroconductive member as that of the implanted conductor 33B and the mounting pad 30p.

It is not necessarily required to implant this wiring into the inside of the connector 30.

For example, wirings may be provided on the lower surface 30b of the connector 30.

In the ease of forming a wiring on the lower surface 30b, the wiring is formed by patterning mainly using a printing method.

This wiring electrically connects the conductor 33B and the mounting pad 30p on the lower surface 30b.

Next, a method of forming the connector 30 including the above-described implanted terminals 32A and 32B will be described.

For example, in the case of using a sintered member as the member that constitutes the connector 30, it is believed that the connector 30 is formed by use of the following material and method.

Firstly, by use of a material such as ceramic, an insulating member having a through hole is formed.

Specifically, four insulating members which correspond to the aforementioned first region 81, the second region 82, the third region 83, and the fourth region 84 are formed.

The four members have through holes which are formed at a position corresponding to the positions of the implanted conductor shown in FIGS. 5 to 8.

Next, the through hole of each of the four insulating members is filled with an electroconductive material, a filled via is formed in each insulating member, and therefore four filled vias are formed in the four insulating members.

The formation of the filled vias are not collectively carried out in the four insulating members, and the formation of the filled via is individually carried out in each of four insulating members.

Thereafter, the four members (insulating member) in which the filled vias are formed in the through holes are stacked so as to correspond to the positions of the first region 81, the second region 82, the third region 83, and the fourth region 84 (stacking step).

Subsequently, in a sintering step, stacked insulating members (stacked body formed of the four members) in which the filled vias are formed are sintered, and a sintered member is thereby formed.

Next, as shown in FIG. 3, the corner regions of the sintered member are ground and removed by use of a grinding tool having a diameter larger than the via hole diameter of the filled via (grinding step).

As a result, part of the insulating member and part of filled via of the sintered member are removed, the connector 30 is obtained in which the implanted terminals 32A and 32B are formed.

In the method of forming the aforementioned connector 30, the stacking step, the sintering step, and the grinding step are carried out in this order. However, in other cases, the order of the above steps may be modified.

For example, before carrying out of the sintering step, the grinding step may be carried out.

Before carrying out of the stacking step, the grinding step may be carried out.

In the case of carrying out the grinding step before the sintering step, since the insulating member is relatively soft, there is an advantage in that it is possible to easily carry out the grinding step.

In the case of carrying out the grinding step before the stacking step, since the accuracy of position of the grinding tool in the Z-direction is not required, there is an advantage in that the manufacture is easy.

Next, an other method of forming the connector 30 including the above-described implanted terminals 32A and 32B will be described.

For example, in the case of using a glass epoxy substrate or a ferrule substrate, which serves as a member constituting the connector 30, it is believed that the connector 30 is formed by use of the following material and method.

Firstly, four insulating members corresponding to the aforementioned first region 81, the second region 82, the third region 83, and the fourth region 84 are prepared.

The four insulating members are a glass epoxy substrate or a ferrule substrate.

Next, in each of the four insulating members, a through hole is formed at the position of the implanted conductor shown in FIGS. 5 to 8.

Furthermore, a filled via is formed in the through hole of each of the four insulating members by a method, such as, for example, plating or the like.

Thereafter, the four members (insulating member) in which the filled vias are formed in the through holes are stacked so as to correspond to the positions of the first region 81, the second region 82, the third region 83, and the fourth region 84 (stacking step).

Next, as shown in FIG. 3, the corner regions of the stacked member are ground and removed by use of a tool having a diameter larger than the diameter of the filled via (grinding step).

As a result, part of the main body 31 and part of the filled via are removed, the connector 30 is obtained in which the implanted terminals 32A and 32B are formed.

In other cases, in the method of forming the aforementioned connector 30, before carrying out of the stacking step, the grinding step may be carried out.

In this case, since the accuracy of position of the grinding tool in the Z-direction is not required, there is an advantage in that the manufacture is easy.

Next, an other method of forming the connector 30 including the above-described implanted terminals 32A and 32B will be described.

For example, in the case of using a silicon substrate or a glass substrate, which serves as a member constituting the connector 30, it is believed that the connector 30 is formed by use of the following material and method.

Firstly, four insulating members corresponding to the aforementioned first region 81, the second region 82, the third region 83, and the fourth region 84 are prepared.

The four insulating members are a silicon substrate or a glass substrate.

Next, in each of the four insulating members, a through hole is formed at the position of the implanted conductor shown in FIGS. 5 to 8.

Through-hole interconnections (through silicon via, TSV) are formed in each of through holes of the four insulating members.

Thereafter, four members (insulating member) having through-hole interconnections formed in through holes are stacked so as to correspond to the positions of the first region 81, the second region 82, the third region 83, and the fourth region 84 (stacking step).

Next, as shown in FIG. 3, the corner regions of the stacked member are ground and removed by use of a tool having a diameter larger than the diameter of the through-hole interconnection (grinding step).

As a result, part of the main body 31 and part of the through-hole interconnection are removed, the connector 30 is obtained in which the implanted terminals 32A and 32B are formed.

In other cases, in the method of forming the aforementioned connector 30, before carrying out of the stacking step, the grinding step may be carried out.

In this case, since the accuracy of position of the grinding tool in the Z-direction is not required, there is an advantage in that the manufacture is easy.

According to the imaging module 10 of the above-described embodiment, since the connector 30 is used which is different from a flexible substrate in which wiring is likely to be broken, connection stability between the coaxial cables 40 and the solid-state image sensing device 20 is ensured, and it is possible to maintain a high degree of reliability.

Moreover, as described above, since the structure is adopted in which the signal cables 40 are connected to the implanted terminals 32A and 32B exposed at the side face of the connector 30, it is possible to reduce the number of layers constitute the connector 30.

Additionally, since the implanted terminals 32A and 32B are provided in the corner regions of the connector 30, it is possible to realize miniaturization of the imaging module.

It is possible to easily manufacture the connector 30.

Particularly, in the case of a ultrafine module such that an outer diameter of an imaging module is, for example, 2 mm, as a result of applying the imaging module 10 according to the embodiment to the imaging module, the imaging module 10 can be arranged in a limited space, and it significantly contributes to miniaturization of the module.

(Modified Example 1 of Imaging Module)

Figure 11:
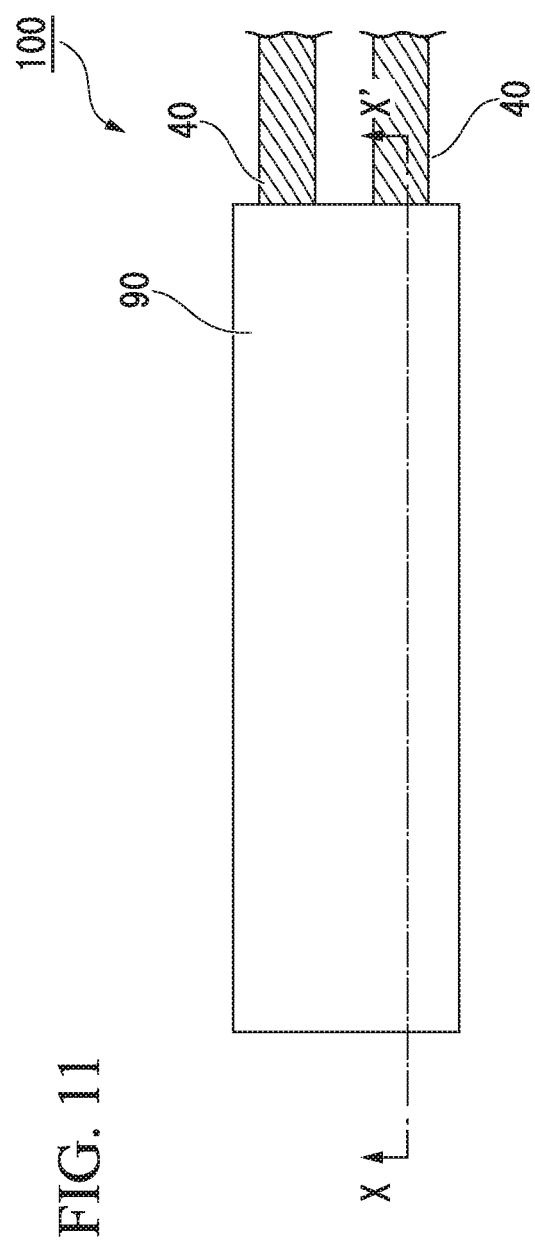
FIG. 11 is a view showing the relevant part of the endoscope according to a modified example 1 of the embodiment of the invention and is a plan view showing the configuration of the imaging module.

FIG. 11 is a top view showing the relevant part of an endoscope according to a modified example 1 of the embodiment of the invention.

Figure 12:
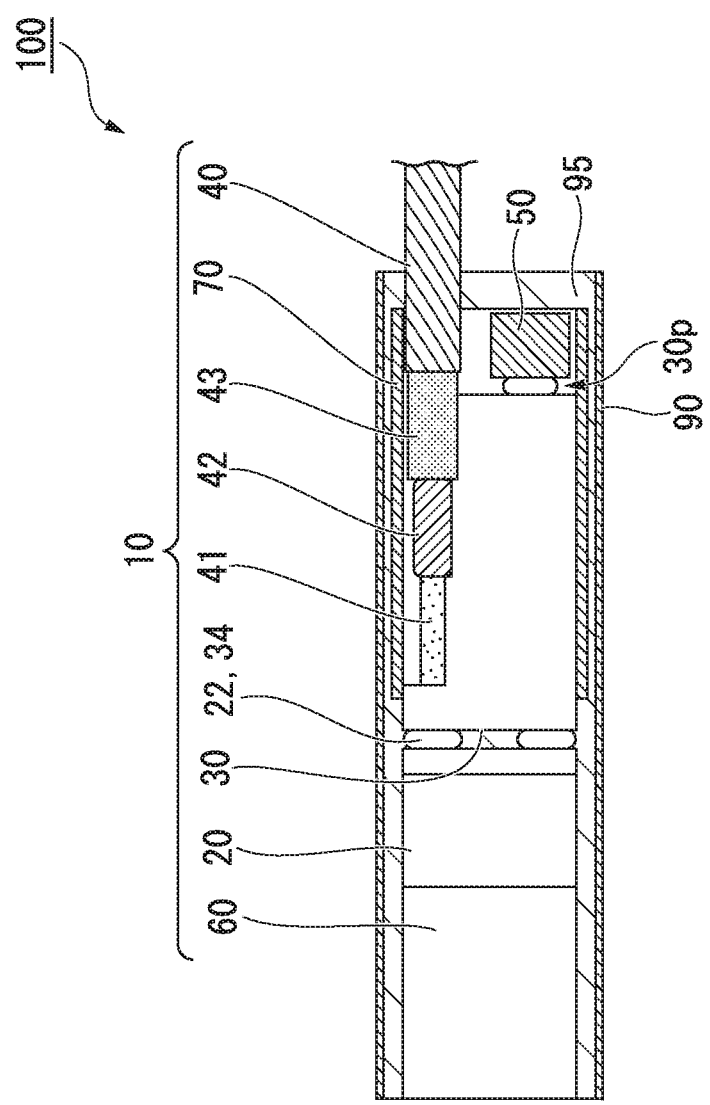
FIG. 12 is a view showing the relevant part of the endoscope according to the modified example 1 of the embodiment of the invention and is a cross-sectional view showing the configuration of the imaging module taken along the line X-X' indicated by FIG. 11.

FIG. 12 is a view showing the relevant part of the endoscope according to the modified example 1 of the embodiment of the invention and is a cross-sectional view showing the configuration of the imaging module taken along the line X-X' indicated by FIG. 11.

In FIGS. 11 and 12, identical reference numerals are used for the elements which are identical to those of the above-described embodiment, and explanations thereof are omitted or simplified here.

As shown in FIG. 11, the imaging module 10 is covered with a housing 90.

As a material used to form the housing 90, a material having biological compatibility is preferably selected.

For example, stainless steel, aluminum, titanium, or ceramics such as alumina or zirconia is preferably used.

As shown in FIG. 12, the space (internal space) between the housing 90 and the imaging module 10 inside of the housing 90 is filled with resin 95 (resin portion), and the imaging module 10 is fixed thereto by the resin 95.

In the configuration, as a result of using the housing 90, the resistance to an external force such as a bending force is improved.

In the imaging module according to the modified example 1, the same effect as the effect obtained by the above-mentioned insulating tube 70, and it is possible to realize the imaging module 10 having a high degree of strength.

(Modified Example 2 of Imaging Module)

Figure 13:
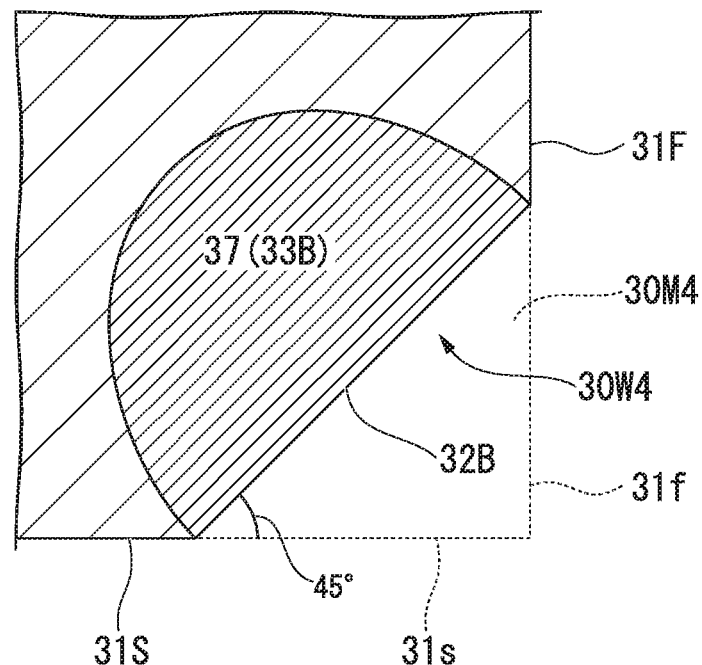
FIG. 13 is a top view showing the connector that constitutes the imaging module according to a modified example 2 of the embodiment of the invention.

FIG. 13 is a top view showing the configuration of the connector that constitutes the imaging module according to a modified example 2 of the embodiment of the invention.

In FIG. 13, identical reference numerals are used for the elements which are identical to those of the above-described embodiments, and explanations thereof are omitted or simplified here.

In the above-described embodiment, the wall surface 30W4 and the implanted terminal 32B, which are formed by grinding the connector 30, have a curved surface in the groove 30M4.

In the modified example 2, the wall surface 30W4 and the implanted terminal 32B which are formed in the groove 30M4 have an inclined surface (flat surface) that is formed so as to extend in a direction from the first side face 31F to the second side face 31S.

The angle of the inclined surface is 45 degrees.

Even in the case of adopting this configuration to the implanted terminal, it is possible to reliably expose the implanted terminal 32B to the outside of the main body 31, and the implanted terminal 32B can serve as a mounting terminal.

According to the modified example 2, since the angle portion of the main body 31 (corner portion between the wall surface 30W4 and the first side face 31F) is chamfered, it is possible to release the stress that is to be applied to the insulating tube which comes into contact with this corner portion.

(Modified Example 3 of Imaging Module)

Figure 14:
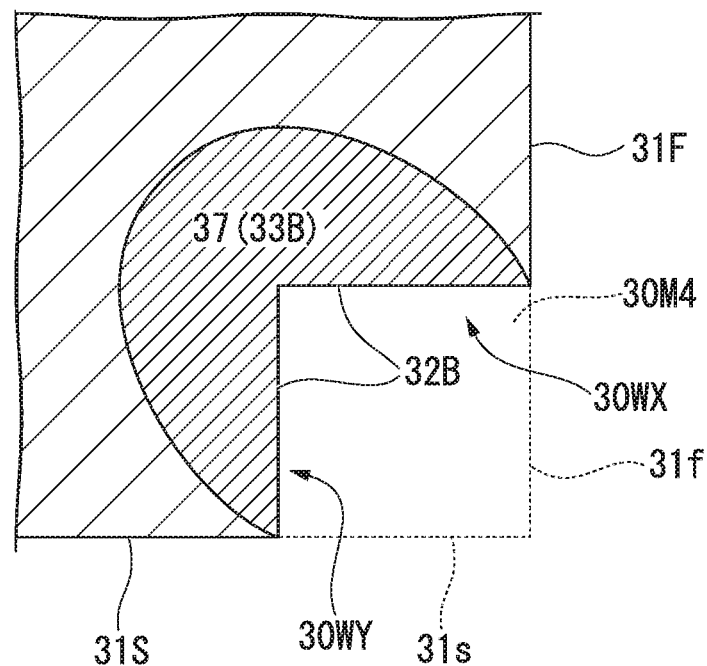
FIG. 14 is a top view showing the connector that constitutes the imaging module according to a modified example 3 of the embodiment of the invention.

FIG. 14 is a top view showing the configuration of a connector that constitutes an imaging module according to a modified example 3 of the embodiment of the invention.

In FIG. 14, identical reference numerals are used for the elements which are identical to those of the above-described embodiments, and explanations thereof are omitted or simplified here.

In the modified example 3, a first vertical wall surface 30WX perpendicular to the first side face 31F and a second vertical wall surface 30WY perpendicular to the second side face 31S are formed in the wall surface 30W4.

The implanted terminal 32B is exposed at each of the first vertical wall surface 30WX and the second vertical wall surface 30WY in the wall surface 30W4.

Even in the case of adopting this configuration to the implanted terminal, it is possible to reliably expose the implanted terminal 32B to the outside of the main body, and the implanted terminal 32B can serve as a mounting terminal.

Since the first vertical wall surface 30WX and the second vertical wall surface 30WY which form the implanted terminal 32B are orthogonal to each other, the surfaces function as a solder receiver that receives flowing solder.

Consequently, according to the modified example 3, in addition to the effects described in the above-described embodiment, it is possible to prevent the solder from flowing to the outside of the main body 31.

Each of the aforementioned modified example 2 and 3 shows a modified example of the constitution of the fourth region 84 serving as part of the connector 30.

The above-mentioned modified example 2 and 3 are applicable to the second region 82 serving as part of the connector 30.

(Modified Example 4 of Imaging Module)

In the above-mentioned embodiment, as shown in FIG. 10, the structure is described in which the sheath conductor 43 having a diameter smaller than that of the implanted terminal 32B (open width of the groove 30M4) is arranged inside the groove 30M4.

The invention is not limited to the ratio of the radius of the sheath conductor 43 to the size (opening size, width) of the implanted terminal 32B.

The diameter of the sheath conductor 43 may be larger than the size of the implanted terminal 32B, and the sheath conductor 43 may partially protrude from the groove 30M4.

Figure 15:
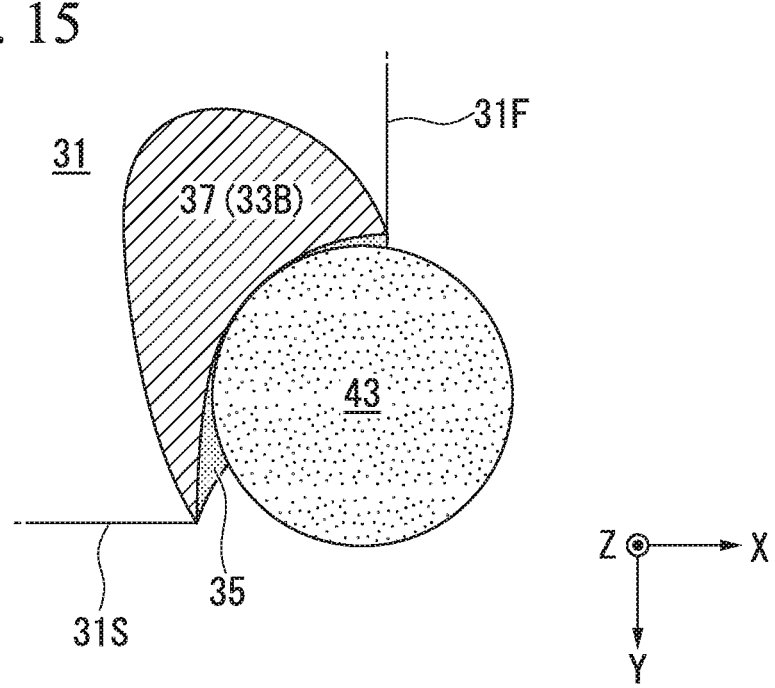
FIG. 15 is a partial cross-sectional view showing a state where an implanted terminal is connected to a sheath conductor of the coaxial cable by solder in the connector that constitutes the imaging module according to a modified example 4 of the embodiment of the invention.

FIG. 15 is a partial cross-sectional view showing a connector that constitutes an imaging module according to a modified example 4 of the embodiment of the invention.

Particularly, FIG. 15 is a view showing a state where the implanted terminal is connected to the sheath conductor 43 of the coaxial cable 40 by solder.

Figure 16:
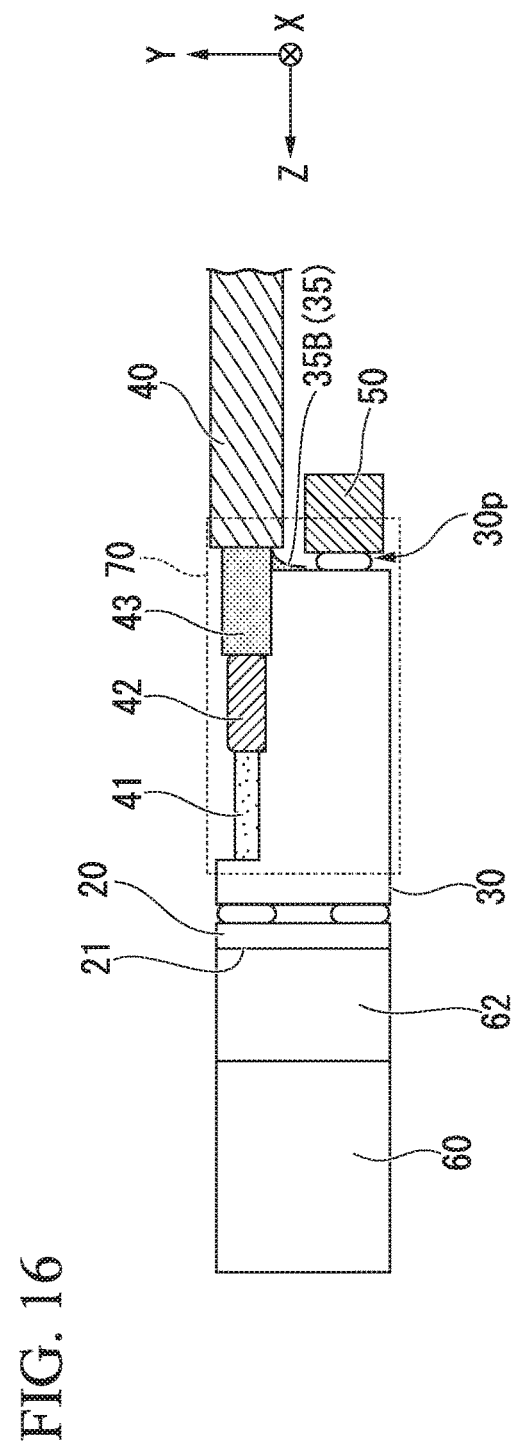
FIG. 16 is a cross-sectional view showing the relevant part of the endoscope provided with the imaging module according to the modified example 4 of the embodiment of the invention.

FIG. 16 is a cross-sectional view showing the relevant part of the endoscope provided with the imaging module according to the modified example 4 of the embodiment of the invention.

Figure 17:
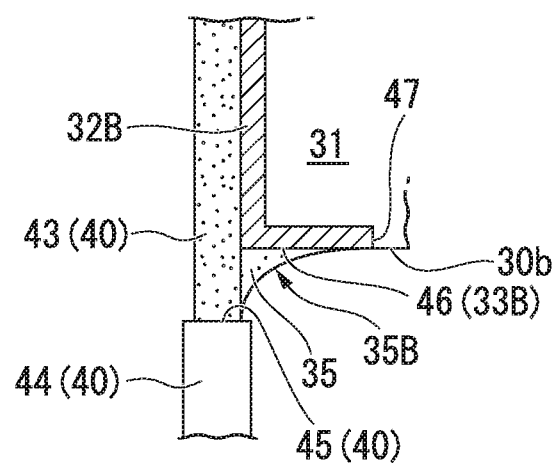
FIG. 17 is an enlarged cross-sectional view showing the relevant part of the connector that constitutes the imaging module according to the modified example 4 of the embodiment of the invention.

FIG. 17 is an enlarged cross-sectional view showing the relevant part of the connector that constitutes the imaging module according to the modified example 4 of the embodiment of the invention.

In FIGS. 15 to 17, identical reference numerals are used for the elements which are identical to those of the above-described embodiment, and explanations thereof are omitted or simplified here.

In the example shown in FIG. 15, at least part of the sheath conductor 43 is arranged inside the groove 30M4, and the other of the sheath conductor 43 protrudes from the first side face 31F and the second side face 31S toward the outside of the groove 30M4.

In the case where part of the sheath conductor 43 is located outside the groove 30M4 as stated above, it is preferable that a curved surface (back fillet 35B) be formed on the surface of the solder 35 as shown in FIG. 16.

As shown in FIG. 17, a fillet-forming terminal 46 (fifth mounting terminal) is provided on the lower surface 30b of the connector 30.

The fillet-forming terminal 46 is connected to the end portion of the implanted terminal 32B on the lower surface 30b and constitutes part of the implanted conductor 33B.

That is, the implanted conductor 33B integrally form the implanted terminal 32B, the inner connecting conductor 37, the inner extending conductor 38B, the mounting pad 34, and the fillet-forming terminal 46.

The fillet-forming terminal 46 has a terminal-front-end portion 47.

The terminal-front-end portion 47 is located at the position separated from the connection surface between the implanted terminal 32B and the sheath conductor 43 of the coaxial cable 40.

In the example shown in FIG. 17, the terminal-front-end portion 47 is located at a substantially center of the connector 30.

That is, the terminal-front-end portion 47 is not formed on the entire surface of the lower surface 30b.

The solder 35 is formed on the lower surface 30b so as to coat the fillet-forming terminal 46 and the implanted terminal 32B.

The coaxial cable 40 includes: the outer coating 44 that coats the sheath conductor 43; and a cable boundary portion 45 that is located at the boundary between the sheath conductor 43 and the outer coating 44.

The cable boundary portion 45 is located outside the lower surface 30b, that is, located at the position apart from the lower surface 30b.

The solder 35 electrically connects the fillet-forming terminal 46 and the sheath conductor 43.

In particular, the solder 35 coats the fillet-forming terminal 46 and the sheath conductor 43 so as to form a curved surface that extends from the terminal-front-end portion 47 to the cable boundary portion 45.

According to the aforementioned modified example 4, the same effect as that of the imaging module according to the above-described embodiment is obtained.

Since it is possible to not only electrically connect the implanted terminal 32B and the sheath conductor 43 but also electrically connect the fillet-forming terminal 46 and the sheath conductor 43 by the solder 35, it is possible to improve the reliability of electrical connection therebetween.

In the case where the sheath conductor 43 that is to be connected to the implanted terminal 32B has a large diameter such that the conductor protrudes from the groove 30M4 to the outside, it is necessary to check a connecting condition between the sheath conductor 43 and the connector 30.

In this case, by observing the lower surface 30b, it is possible to determine whether or not the solder 35 has fillet configuration (back fillet 35B) on the fillet-forming terminal 46, and it is thereby possible to easily determine a connecting condition between the sheath conductor 43 and the connector 30.

In the example shown in FIG. 17, the mounting pad 30p is not shown; however, the invention is not limited to the example shown in FIG. 17.

Both the mounting pad 30p and the fillet-forming terminal 46 may be provided on the lower surface 30b.

In this case, common terminals (terminal, pad, and electrode) which are common to the mounting pads 30p and the fillet-forming terminals 46 are provided on the lower surface 30b.

The common terminals are connected to the implanted terminals 32B.

Specifically, since the number of the terminals of the capacitor 50 is two, two independent common terminals are formed on the lower surface 30b, and the two common terminals are each connected to a corresponding one of the two implanted terminals 32B.

The common terminals may be the implanted terminals that are implanted in the main body 31.

In the case where such common terminals are provided on the lower surface 30b, an insulating coating layer may be provided on the common terminals so as to be located between the mounting pad 30p and the fillet-forming terminal 46 and so as to cross two common terminals.

In this case, for example, the insulating coating layer extends in the direction orthogonal to the direction in which the common terminal extends.

(Modified Example 5 of Imaging Module)

As the configuration including the sheath conductor 43 that is partially protrudes from the groove 30M4, the above-mentioned modified example 4 shows the configuration to which the back fillet 35B is applied; however, the invention is not limited to this configuration.

A back fillet may be applied to the configuration in which the sheath conductor 43 does not protrude from the groove 30M4 (the structure including the sheath conductor 43 that is arranged inside the groove 30M4).

That is, in a modified example 5 of an imaging module, the back fillet 35B shown in FIGS. 16 and 17 may be applied to the wiring structure shown in FIG. 10.

In this case, as shown in FIG. 16, the solder 35 is formed along the surface shape of the fillet-forming terminal 46 and the sheath conductor 43, and the cross-sectional shape of the solder 35 is thereby formed in an L shape.

Specifically, the solder 35 connects the fillet-forming terminal 46 and the sheath conductor 43 so as to form the three-dimensional connection structure that expands from the sheath conductor 43 to the entire surface of the fillet-forming terminal 46.

Since the solder 35 is in close contact with the portion between the fillet-forming terminal 46 and the sheath conductor 43, it is possible to improve the mechanical strength between the fillet-forming terminal 46 and the sheath conductor 43.

(Modified Example 6 of Imaging Module)

Figure 18:
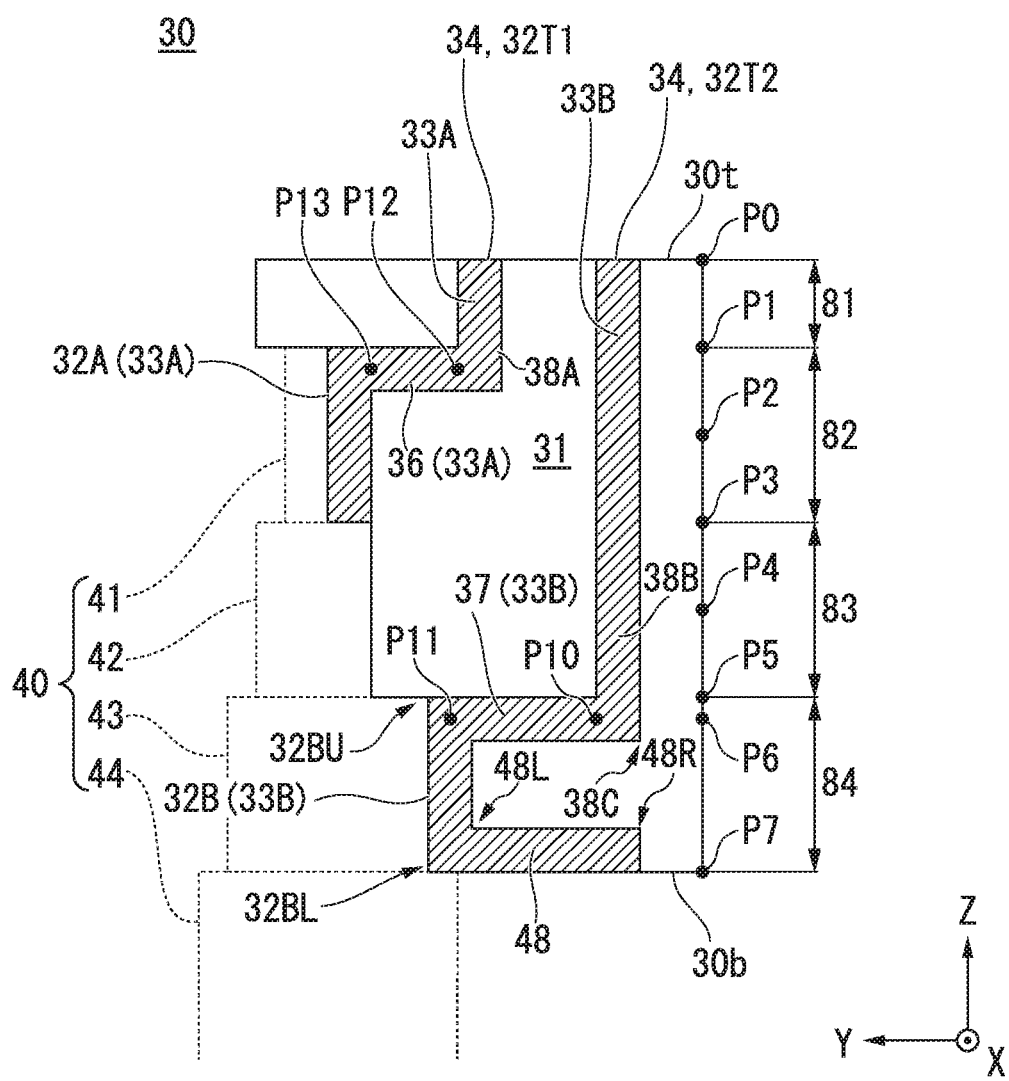
FIG. 18 is an explanatory cross-sectional view showing the positional relationship between the connector and the coaxial cable which constitute the imaging module according to a modified example 6 of the embodiment of the invention.

FIG. 18 is an explanatory cross-sectional view showing the positional relationship between the connector and the coaxial cable which constitute the imaging module according to a modified example 6 of the embodiment of the invention.

In FIG. 18, identical reference numerals are used for the elements which are identical to those of the above-described embodiment, and explanations thereof are omitted or simplified here.

The invention is not limited to the configuration of the connector 30 shown in FIG. 4.

The invention also includes the configuration of the connector 30 according to the modified example 6 shown in FIG. 18.

The inner extending conductor 38A penetrates through the first region 81 and does not penetrate through the second region 82.

As shown in FIG. 18, the inner connecting conductor 36 extends in the Y-direction.

That is, the extending direction of the inner connecting conductor 36 is different from the extending direction of (the Z-direction) the inner extending conductor 38A.

The upper surface of the inner connecting conductor 36 is located at the point P1, that is, at the upper end of the second region 82.

The inner connecting conductor 36 is connected to the inner extending conductor 38A at the first end P12 of the inner connecting conductor 36.

That is, the implanted conductor 33A forms an first inner curved conductor that is bent at the first end P12 (first inner bent portion that is located inside the main body 31).

Particularly, the inner extending conductor 38A and the inner connecting conductor 36 form the first inner curved conductor that is bent at the first end P12.

On the other hand, the inner connecting conductor 36 is connected to the implanted conductor 33A at the second end P13 of the inner connecting conductor 36 (end portion on the opposite side of the first end P12).

The inner connecting conductor 36 and the implanted terminal 32A form a first outer curved conductor that is bent at the second end P13 (bent portion).

Here, the second end P13 is a first outer bent portion that is located at the outer portion of the main body 31 which is located further outward than the first inner bent portion (first end P12).

The inner extending conductor 38A, the inner connecting conductor 36, and the implanted terminal 32A which constitute the implanted conductor 33A form a three-dimensional structure that is integrally formed inside the main body 31. The inner extending conductor 38A, the inner connecting conductor 36, and the implanted terminal 32A form a conductor formed in a substantially inverted S-shape so as to bend at two bent portions P12 and P13.

The inner extending conductor 38B does not penetrate through the main body 31.

The inner extending conductor 38B has the end portion (inner end) that is located on the opposite side of the mounting pad 34 (outer end portion).

The inner end 38C of the inner extending conductor 38B is located inside the main body 31.

The inner end 38C is connected to the inner connecting conductor 37 at the first end P10 of the inner connecting conductor 37.

That is, the implanted conductor 33B forms a second inner curved conductor that is bent at the first end P10 (second inner bent portion that is located inside the main body 31).

Specifically, the inner extending conductor 38B and the inner connecting conductor 37 form the second inner curved conductor that is bent at the first end P10.

The implanted terminal 32B includes a first connection end 32BU and a second connection end 32BL that is located on the opposite side of the first connection end 32BU.

The first connection end 32BU is located at the upper end of the implanted terminal 32B.

The second connection end 32BL is located at the lower end of the implanted terminal 32B.

The first connection end 32BU is connected to the second end P11 of the inner connecting conductor 37.

Particularly, the inner connecting conductor 37 and the implanted terminal 32B form an outer curved conductor that is bent at the second end P11 (bent portion).

Here, the second end P11 is a second outer bent portion that is located at the outer portion of the main body 31 which is located further outward than the second inner bent portion (first end P10).

A lower-end implanted conductor 48 is provided on the lower surface 30b of the connector 30.

The lower-end implanted conductor 48 includes a first wiring end 48L and a second wiring end 48R that is located on the opposite side of the first wiring end 48L.

The first wiring end 48L is located at the left end of the lower-end implanted conductor 48.

The second wiring end 48R is located at the right end of the lower-end implanted conductor 48 and is connected to the mounting pad 30p.

The second connection end 32BL of the implanted terminal 32B is connected to the first wiring end 48L of the lower-end implanted conductor 48.

That is, the lower-end implanted conductor 48 and the implanted terminal 32B form a curved conductor that is bent at the second connection end 32BL (bent portion).

Here, the second connection end 32BL is an outer bent portion that is located at the outer portion of the main body 31 which is located further outward than the inner bent portion.

Particularly, the inner extending conductor 38B, the inner connecting conductor 37, the implanted terminal 32B, and the lower-end implanted conductor 48 which constitute the implanted conductor 33B form a three-dimensional structure that is integrally formed inside the main body 31.

This three-dimensional structure has three bent portions (the first end P10, the second end P11, and the second connection end 32BL).

In other words, the implanted conductor 33B includes: a first conductor formed in a substantially inverted S-shape so as to bend at the first end P10 and the second end P11; and a second conductor formed in a U-shape so as to bend at the second end P11 and the second connection end 32BL.

The implanted conductor 33B is formed of combination of the first conductor and the second conductor.

The mounting pad 34 is electrically conducted to the mounting pad 30p through the implanted conductor 33B having the above-described configuration.

In the case of the modified example 6, in order to prevent solder bridging between the solder 35 and the capacitor 50 serving as an electronic component, a resist made of an insulating material may be disposed on the lower-end implanted conductor 48 and between the mounting pad 30p and the implanted terminal 32B.

Also, in the above-mentioned modified example 6, the same effect as the above-described effect is obtained.

In the above-mentioned modified example 6, the structure is described in which the lower-end implanted conductor is provided on the lower surface 30b; however, the invention is not limited to this configuration.

For example, a wiring may be provided on the lower surface 30b.

In this case, the wiring has the first wiring end 48L and the second wiring end 48R and is connected to the second connection end 32BL.

In the case of forming a wiring on the lower surface 30b, the wiring is formed by patterning mainly using a printing method.

This wiring electrically connects the second connection end 32BL and the mounting pad 30p on the lower surface 30b.

While preferred embodiments of the invention have been described and illustrated above, it should be understood that these are exemplary examples of the invention and are not to be considered as limiting. Additions, omissions, substitutions, and other modifications can be made without departing from the scope of the invention. Accordingly, the invention is not to be considered as being limited by the foregoing description, and is only limited by the scope of the appended claims.

In the above-described embodiments and modified examples, the implanted terminals 32A and 32B are exposed to the outside by grinding the corner regions 30KA and 30KC of the connector 30; however, the corner regions 30KA and 30KC may be removed by polishing the corner regions 30KA and 30KC, and the implanted terminals 32A and 32B may be exposed to the outside.

In this case, the wall surfaces of the grooves 30M2 and 30M4 is a polished surface formed by polishing and can be said to be a surface having a polishing trace that occurs due to contact between a polishing tool and the main body 31.

In each of the second region 82 and the fourth region 84, the number of implanted terminals is two.

The invention is not limited to this, the number of implanted terminals may be three or more in each of the second region 82 and the fourth region 84.

In this case, it is preferable that two implanted terminals be provided at the respective corner regions of the connector 30 and arranged on the diagonal line (at the positions which are opposed to each other).

Consequently, it is possible to realize miniaturization of the imaging module.

In the above-described embodiment, in each of the second region 82 and the fourth region 84, two grooves are provided so as to sandwich the side face 39, and the implanted terminal is provided in each groove.

The invention is not limited to this, the two grooves may be arranged on the diagonal line of the connector 30 (at the positions which are opposed to each other).

In this case, the implanted terminal is provided in each of the two grooves.

In this case, the two implanted terminals are arranged on the diagonal line of connector 30.

Regarding the depths D1, D2, and D3 of the grooves 30M2, 30M3, and 30M4, in the above-described embodiment, the relationship of D1<D2<D3 is satisfied.

The invention is not limited to the above-described relationship, the depths D1, D2, and D3 may be a constant width (i.e., the relationship of D1=D2=D3 is satisfied).

In this case, since it is possible to form the grooves 30M2, 30M3, and 30M4 by use of the same grinding tool, a common grinding tool can be used in the grinding step, and there is an advantage in that the manufacture is easy.

In the above-described embodiments, the case is described where an example of "first end face" of the invention is the upper surface 30t, and an example of "second end face" of the invention is the lower surface 30b.

The invention is not limited to the positions of "first end face" and "second end face".

An example of the first end face may be the lower surface 30b, and an example of the second end face may be the upper surface 30t.

In the case where the imaging module is positioned so that the direction from the first end face to the second end face intersects with the direction of gravitational force, the first end face may be a left end face, and the second end face may be a right end face.

Conversely, the first end face may be a right end face, and the second end face may be a left end face.

What is claimed is:

1. An imaging module comprising:
   a solid-state image sensing device comprising an imaging-device terminal;
   a connector having a first end face, a second end face located opposite to the first end face, a first side face orthogonal to the first end face, and a second side face orthogonal to the first end face and the first side face, the connector comprising: a main body serving as an insulating member; a first implanted conductor that is implanted in an inside of the main body; a second implanted conductor that is implanted in an inside of the main body and is longer than the first implanted conductor; a first mounting terminal that is provided on the first end face, is electrically connected to the imaging-device terminal, and constitutes part of the first implanted conductor and part of the second implanted conductor; a first groove that includes a second mounting terminal constituting part of the first implanted conductor and is provided between the first side face and the second side face; a second groove that includes a third mounting terminal constituting part of the second implanted conductor and is provided between the first side face and the second side face; and a third groove that is located between the first groove and the second groove in an extending direction of the main body;
   a coaxial cable comprising: an internal conductor that is provided in the first groove and is electrically connected to the second mounting terminal; a sheath conductor that is provided in the second groove and is electrically connected to the third mounting terminal; and a coated portion that is provided in the third groove;
   a fifth mounting terminal that is provided on the second end face and constitutes part of the second implanted conductor; and
   solder that electrically connects the fifth mounting terminal and the coaxial cable, wherein
   the fifth mounting terminal includes a terminal-front-end portion, and the terminal-front-end portion is located at a position apart from a connection surface between the second mounting terminal and the coaxial cable,
   the coaxial cable includes: an outer coating provided around the periphery of the sheath conductor; and a cable boundary portion located at a boundary between the sheath conductor and the outer coating,
   the cable boundary portion is located outside the second end face, and
   the solder coats the fifth mounting terminal and the sheath conductor so as to form a curved surface that extends from the terminal-front-end portion to the cable boundary portion.

2. The imaging module according to claim 1, wherein
the first implanted conductor comprises: a first inner extending conductor that extends in a direction from the first end face to the second end face; and a first inner connecting conductor that extends in a direction from the first inner extending conductor to the first groove, and
the first inner connecting conductor is connected to the second mounting terminal.

3. The imaging module according to claim 2, wherein
the first inner extending conductor and the first inner connecting conductor constitute the first implanted conductor and form a first inner curved conductor, and the first inner curved conductor is bent at a first inner bent portion that is located inside the main body.

4. The imaging module according to claim 3, wherein
the second mounting terminal and the first inner connecting conductor constitute the first implanted conductor and form a first outer curved conductor, and the first outer curved conductor is bent at a first outer bent portion that is located at an outer portion of the main body which is located further outward than the first inner bent portion.

5. The imaging module according to claim 1, wherein
the second implanted conductor comprises: a second inner extending conductor that extends in a direction from the first end face to the second end face; and a second inner connecting conductor that extends in a direction from the second inner extending conductor to the second groove, and
the second inner connecting conductor is connected to the third mounting terminal.

6. The imaging module according to claim 5, wherein
the second inner extending conductor and the second inner connecting conductor constitute the second implanted conductor and form a second inner curved conductor, and the second inner curved conductor is bent at a second inner bent portion that is located inside the main body.

7. The imaging module according to claim 6, wherein
the third mounting terminal and the second inner connecting conductor constitute the second implanted conductor and form a second outer curved conductor, and the second outer curved conductor is bent at a second outer bent portion that is located at an outer portion of the main body which is located further outward than the second inner bent portion.

8. The imaging module according to claim 6, wherein
the second inner connecting conductor is a branch conductor that is separated from the second implanted conductor at a branch portion, and the branch portion is located inside the main body.

9. The imaging module according to claim 1, wherein
the first mounting terminal comprises: a first conductive terminal that constitutes part of the first implanted conductor; and a second conductive terminal that constitutes part of the second implanted conductor.

10. The imaging module according to claim 1,
wherein a depth of the third groove is larger than a depth of the first groove, and a depth of the second groove is larger than the depth of the third groove;
a diameter of the coated portion is larger than a diameter of the internal conductor, and
a diameter of the sheath conductor is larger than the diameter of the coated portion.

11. The imaging module according to claim 1, further comprising:
a fourth mounting terminal provided on the second end face; and
an electronic component connected to the fourth mounting terminal.

12. The imaging module according to claim 1, further comprising
a lens unit that forms an image onto a light-receiving face of the solid-state image sensing device.

13. The imaging module according to claim 1, further comprising
an insulating tube that covers part of the coaxial cable and the connector.

14. The imaging module according to claim 1, further comprising:
a housing that covers the solid-state image sensing device, the connector, and part of the coaxial cable; and
a resin portion that fills an internal space of the housing.

15. The imaging module according to claim 1, wherein
a length of the internal conductor, a length of the sheath conductor, and a length of the coated portion are in a range of 0.1 to 1.0 mm.

16. The imaging module according to claim 1, wherein
a distance between a pair of second mounting terminals and a distance between a pair of third mounting terminals are in a range of 0.1 to 1.0 mm.

17. An endoscope comprising the imaging module according to claim 1.

18. The imaging module according to claim 1, wherein
the curved surface is exposed to a space outside the second end face.

* * * * *